US010747777B2

(12) United States Patent
Hattori

(10) Patent No.: US 10,747,777 B2
(45) Date of Patent: Aug. 18, 2020

(54) COMPUTER SYSTEM AND TRANSACTION PROCESSING MANAGEMENT METHOD

(71) Applicant: Hitachi, Ltd., Tokyo (JP)

(72) Inventor: Megumi Hattori, Tokyo (JP)

(73) Assignee: HITACHI, LTD., Tokyo (JP)

( * ) Notice: Subject to any disclaimer, the term of this patent is extended or adjusted under 35 U.S.C. 154(b) by 851 days.

(21) Appl. No.: 15/501,589

(22) PCT Filed: Mar. 11, 2015

(86) PCT No.: PCT/JP2015/057160
§ 371 (c)(1),
(2) Date: Feb. 3, 2017

(87) PCT Pub. No.: WO2016/143095
PCT Pub. Date: Sep. 15, 2016

(65) Prior Publication Data
US 2017/0242904 A1 Aug. 24, 2017

(51) Int. Cl.
*G06F 16/27* (2019.01)
*G06F 16/21* (2019.01)
(Continued)

(52) U.S. Cl.
CPC .............. *G06F 16/27* (2019.01); *G06F 9/466* (2013.01); *G06F 9/52* (2013.01); *G06F 12/00* (2013.01); *G06F 16/217* (2019.01)

(58) Field of Classification Search
CPC ........ G06F 16/27; G06F 16/217; G06F 9/466; G06F 9/52; G06F 12/00
See application file for complete search history.

(56) References Cited

U.S. PATENT DOCUMENTS 6,772,363 B2   8/2004 Pedone et al.
8,832,113 B2 * 9/2014 Tamura ............ G06F 16/24578
                                                  707/747
(Continued)

FOREIGN PATENT DOCUMENTS

WO   2014/170952 A1   10/2014
WO   2014/199568 A1   12/2014

OTHER PUBLICATIONS

International Search Report of PCT/JP2015/057160 dated May 26, 2015.

*Primary Examiner* — Kris E Mackes
*Assistant Examiner* — Tiffany Thuy Bui
(74) *Attorney, Agent, or Firm* — Mattingly & Malur, PC

(57) ABSTRACT

A computer system has a database constructed from storage areas in each of a plurality of computers, which stores data including an operation number for managing an operation status by transaction processing. The data is allocated to the computers in accordance with predetermined management ranges, and the computers include a control module configured to generate an operation history indicating specifics of each operation included in the piece of transaction processing in a case of receiving an execution request. A distribution module determines a sequence number of applying a plurality of operation histories to the database and transmits them to the other computers. A conflict judgment module determines whether a piece of transaction processing corresponding to an operation history conflicts based on the operation number; and an applying module operates the database based on an operation history corresponding to a piece of transaction processing to the database determined not to conflict.

11 Claims, 14 Drawing Sheets

(51) Int. Cl.
*G06F 9/52* (2006.01)
*G06F 12/00* (2006.01)
*G06F 9/46* (2006.01)

(56) References Cited

U.S. PATENT DOCUMENTS

| | | | | |
|---|---|---|---|---|
| 9,043,363 | B2* | 5/2015 | Dragojevic | G06F 9/467 707/792 |
| 9,075,710 | B2* | 7/2015 | Talagala | G06F 12/0246 |
| 9,262,323 | B1* | 2/2016 | Shankaran | G06F 16/184 |
| 10,387,402 | B2* | 8/2019 | Stefani | G06F 16/2365 |
| 2003/0220935 | A1* | 11/2003 | Vivian | G06F 16/27 |
| 2004/0172509 | A1* | 9/2004 | Takeda | G06F 11/2066 711/162 |
| 2006/0235901 | A1* | 10/2006 | Chan | H04L 47/10 |
| 2007/0198518 | A1* | 8/2007 | Luchangco | G06F 16/2315 |
| 2007/0299958 | A1* | 12/2007 | Hu | H04L 41/06 709/223 |
| 2011/0082836 | A1* | 4/2011 | Wang | G06F 16/1787 707/649 |
| 2011/0167361 | A1* | 7/2011 | Watanabe | H04L 63/08 715/760 |
| 2011/0202564 | A1* | 8/2011 | Kodaka | G06F 16/22 707/781 |
| 2012/0157062 | A1* | 6/2012 | Kim | G06Q 30/0601 455/414.1 |
| 2012/0284231 | A1* | 11/2012 | Basescu | G06F 16/219 707/638 |
| 2013/0054869 | A1* | 2/2013 | Tolia | G06F 12/0871 711/102 |
| 2013/0103729 | A1* | 4/2013 | Cooney | G06F 16/188 707/831 |
| 2013/0250696 | A1* | 9/2013 | Lee | G11C 11/5628 365/185.22 |
| 2014/0019573 | A1* | 1/2014 | Swift | H04L 67/1095 709/212 |
| 2014/0129519 | A1* | 5/2014 | Leshchiner | G06F 16/273 707/613 |
| 2014/0359043 | A1* | 12/2014 | Gao | G06F 15/167 709/212 |
| 2015/0012539 | A1* | 1/2015 | McHugh | G06F 16/1873 707/737 |
| 2015/0242481 | A1 | 8/2015 | Hasegawa et al. | |
| 2015/0378779 | A1* | 12/2015 | Busaba | G06F 9/30098 711/147 |
| 2016/0110285 | A1* | 4/2016 | Sukenari | G06F 3/0604 711/119 |

* cited by examiner

DATA STORE 122

| KEY 401 | VALUE 402 | GROUP ID 405 | REFERENCE NUMBER 403 | UPDATE NUMBER 404 |
|---|---|---|---|---|
| KEY A | VALUE A | GROUP 1 | 1 | 1 |
| KEY B | VALUE B | GROUP 1 | - | - |
| KEY C | VALUE C | GROUP 1 | - | - |
| KEY D | VALUE D | GROUP 2 | 1 | 1 |
| KEY E | VALUE E | GROUP 2 | 1 | 1 |
| KEY F | VALUE F | GROUP 2 | - | - |
| KEY G | VALUE G | GROUP 3 | 1 | 1 |
| KEY H | VALUE H | GROUP 3 | 1 | 1 |
| KEY I | VALUE I | GROUP 3 | 1 | 1 |
| ⋮ | ⋮ | | ⋮ | ⋮ |

GROUP OPERATION HISTORY 123

| GROUP ID 601 | SIR 602 | SIW 603 | SR 604 | SW 605 |
|---|---|---|---|---|
| GROUP 1 | 1 | 1 | 1 | 1 |
| GROUP 2 | 1 | 1 | 1 | 1 |
| GROUP 3 | 1 | 1 | 1 | 1 |

600

*FIG. 8*

COMPUTER SYSTEM AND TRANSACTION PROCESSING MANAGEMENT METHOD

BACKGROUND OF THE INVENTION

This invention relates to a distributed database constructed on a plurality of computers.

In recent years, the amount of data has increased explosively in computer system for executing an application using the Web; there are known various systems for enhancing performance of data access by distributing the data to a plurality of servers. For example, there is known a Not only SQL (NoSQL) database, such as key-value store (KVS).

The KVS can adopt various configurations. For example, there are known a configuration (memory store) in which data is stored in a volatile storage medium capable of accessing data at high speed, such as a memory, a configuration (disk store) in which data is stored in a non-volatile storage medium that is superior in durability of data storage, such as a solid state disk (SSD) or an HDD, and a configuration in which the above-mentioned configurations are used in combination.

The memory store and the disk store hold a plurality of records each including data (a value) paired with identification information (a key) of the data.

An in-memory distributed KVS is a KVS constructed on the memories of a plurality of servers configured as a cluster. Such a configuration enables high speed data access and high system availability.

Each server constructing the distributed KVS stores data of a predetermined management range (e.g., a key range). Further, to ensure the reliability of the data in the distributed KVS, each server stores replicated data of the data included in the management range managed by another server.

Each server executes processing as a master server of the data included in the management range. In other words, in response to a read request including a key, the server managing the management range including the data associated with that key reads the data associated with the key. Further, each server operates as a slave server of replicated data of the management range managed by another server.

In the following description, the data to be managed by the master server is also referred to as master data, and the data to be managed by the slave server is also referred to as slave data.

Therefore, in the distributed KVS, even when a failure occurs in one server, another server holding replicated data of the master data of that server can continue processing as a new master server.

For transaction processing using a database such as the distributed KVS, it is important to guarantee the data integrity, i.e. the consistency in data after executing the transaction processing.

When a failure such as a network error occurs, the distributed KVS system regards the failure as a failure in a master server and changes its slave server into a new master server. As a result, two master servers coexist in the system and the two master servers may execute transaction processing onto the same master data. In such a case, the consistency is not guaranteed.

U.S. Pat. No. 6,772,363 discloses aborting all transaction processing (for example, see FIG. 3) when a failure occurs in a primary data server that is processing a transaction.

SUMMARY OF THE INVENTION

The existing technique disclosed in U.S. Pat. No. 6,772,363 treats all transaction processing as errors to guarantee the consistency. However, in the case where data, to be processed by each of the plurality of pieces of transaction processing, is different, the consistency can be guaranteed even if the plurality of pieces of transaction processing are executed.

Therefore, in the prior art, there is a problem that the availability of the system including the database is lowered. The availability of the system can be increased by executing transaction processing that guarantees the data consistency, even if a plurality of master servers coexist.

The present invention can be appreciated by the description which follows in conjunction with the following figures, wherein: a computer system comprises a plurality of computers coupled to one another via a network, the computer system has a database constructed from storage areas included in each of the plurality of computers. The database stores a plurality of pieces of data, each of the plurality of pieces of data includes a first operation number for managing an operation status by transaction processing, a piece of transaction processing including a plurality of operations onto the database. The plurality of pieces of data is allocated to the plurality of computers in accordance with predetermined management ranges. The plurality of computers is configured to: operate as a master configured to control the plurality of operations onto data included in a management range; and hold a plurality of pieces of replicated data included in a different management range in order to operate as a master of the different management range in place of another computer operating as a master of the different management range. The plurality of computers including: a control module configured to generate an operation history indicating specifics of each of the plurality of operations included in the piece of transaction processing in a case of receiving an execution request of transaction processing; a distribution module configured to determine a sequence number of applying a plurality of operation histories to the database and transmit the plurality of operation histories with the sequence number to the other computers; a conflict judgment module configured to, in a case of receiving from the distribution module a plurality of operation histories generated by a plurality of computers each operating as a master controlling a same management range, determine whether each of a plurality of pieces of transaction processing each corresponding to the plurality of operation histories conflicts based on the first operation number; and an applying module configured to apply an operation history corresponding to a piece of transaction processing to the database: the piece of transaction processing is determined by the conflict judgment module not to conflict with any other transaction processing.

According to one embodiment of the present invention, it can guarantee data consistency in the database and increase the availability of the computer system including the database.

BRIEF DESCRIPTION OF THE DRAWINGS

The present invention can be appreciated by the description which follows in conjunction with the following figures, wherein:

FIG. 7 is an explanatory diagram for illustrating a format of data stored in the data store according to Embodiment 2;

FIG. 8 is an explanatory diagram for illustrating an example of group access information according to Embodiment 2;

DETAILED DESCRIPTION OF THE EMBODIMENTS

Embodiment 1

Figure 1:
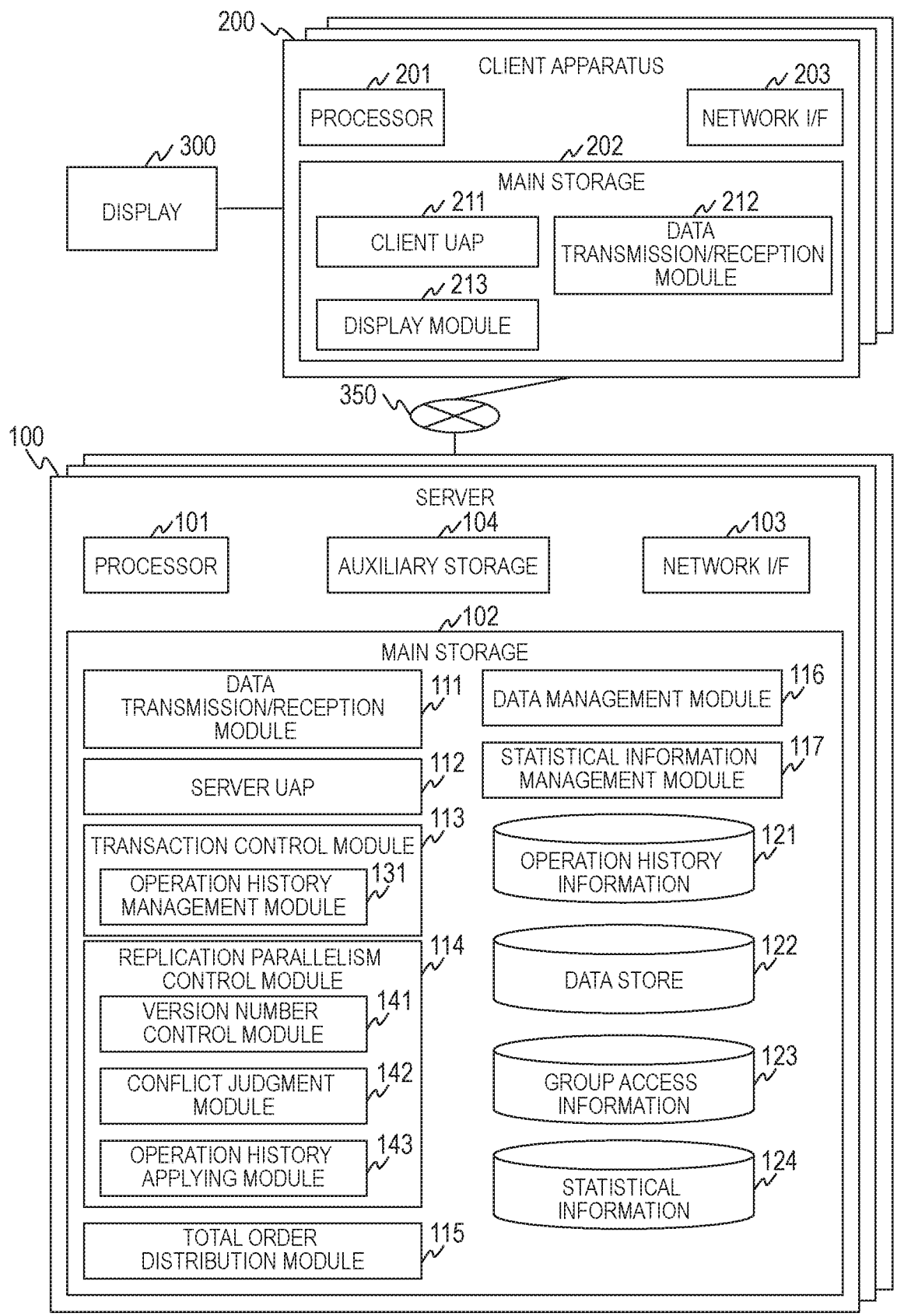
FIG. 1 is a block diagram for illustrating a configuration of a computer system in Embodiment 1.

FIG. 1 is a block diagram for illustrating a configuration of a computer system according to Embodiment 1.

The computer system includes a plurality of servers 100 and a plurality of client apparatuses 200. The plurality of servers 100 are connected via a network 350 and further, each server 100 and the client apparatuses 200 are also connected via the network 350.

The network 350 may conceivably have various wired and wireless configurations, such as a LAN, a WAN, and a SAN. This invention can employ any type of network as far as the servers 100 and the client apparatuses 200 can communicate. The network 350 includes a plurality of network apparatuses (not shown). The network apparatus include, for example, a switch and a gateway.

A server 100 includes a processor 101, a main storage 102, a network interface 103, and an auxiliary storage 104. In this embodiment, a distributed KVS is constructed by the plurality of servers 100. The server 100 executes various processes in accordance with requests transmitted from the client apparatus 200. This embodiment is described assuming that each of the plurality of servers 100 have the same configuration.

The server 100 may further include input device, such as a keyboard, a mouse, and a touch panel, and output device, such as a display.

The processor 101 executes programs stored in the main storage 102. Functions of the server 100 can be implemented by the processor 101 executing the programs. Hereinafter, processing described with sentences having a subject of a program represents that the program is being executed by the processor 101.

The main storage 102 stores programs to be executed by the processor 101 and information necessary for executing the programs. The main storage 102 can be a volatile memory or a non-volatile memory.

The main storage 102 in this embodiment stores programs for implementing a data transmission/reception module 111, a server UAP 112, a transaction control module 113, a replication parallelism control module 114, a total order distribution module 115, a data management module 116, and a statistical information management module 117.

The main storage 102 further stores operation history information 121, a data store 122, group access information 123, and statistical information 124.

Figure 3:
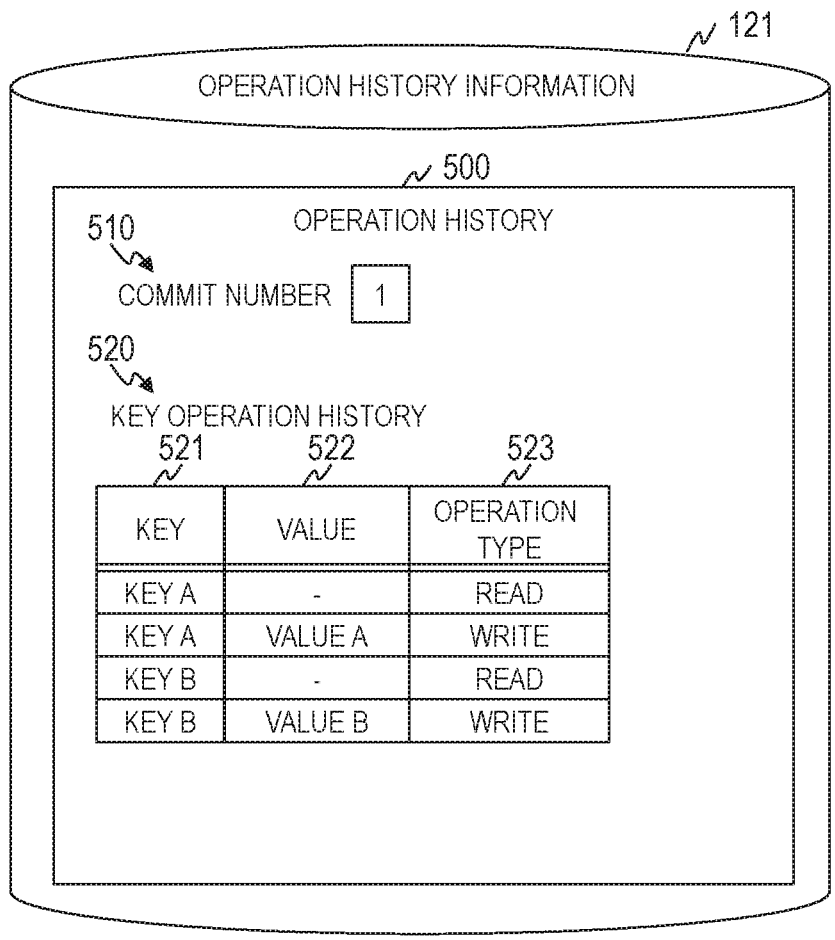
FIG. 3 is an explanatory diagram for illustrating an example of operation history information according to Embodiment 1.

The operation history information 121 includes one or more operation histories 500 each of which corresponds to a piece of transaction processing (see FIG. 3). Details of the operation history information 121 will be described later with reference to FIG. 3.

The data store 122 is a distributed database (memory store). In this embodiment, the plurality of servers 100 constitute a cluster; the distributed database is constructed on the storage areas of the plurality of servers 100. This embodiment adopts a distributed KVS as the distributed database.

In the distributed KVS, a plurality of pieces of key-value data each of which corresponding to records included in file data is distributed to the plurality of servers 100 for the prescribed key range (management range). Key-value data is data including at least a key and a value. The key-value data can include information other than the key and the value.

Each of the plurality of servers 100 constructing the distributed KVS stores master data and slave data. The master data is key-value data managed by a server 100 and the slave data is a replica of the key-value data managed by another server 100.

In a distributed KVS, a server 100 processes an operation request, which is transmitted from the client apparatus 200, for master data managed by the server 100. In a distributed KVS, if a failure occurs in a server 100 managing some master data, a server 100 holding slave data, which corresponds to the some master data, executes process on the some master data.

The group access information 123 stores information for managing an operation status by key group unit. Embodiment 1 does not use the group access information 123 because Embodiment 1 handles operation by key unit. Details of the group access information 123 and details of the processing using the group access information 123 will be described in Embodiment 2.

The statistical information 124 stores information related to the statistics about transaction processing. Details of the statistical information 124 and details of the processing using the statistical information 124 will be described in Embodiment 4.

The network interface 103 is an interface for connecting the server 100 to other apparatuses via the network 350. The auxiliary storage 104 stores various types of information. The auxiliary storage 104 can be, for example, an HDD or an SSD. A disk store (not shown) corresponding to the distributed KVS may be constructed on the auxiliary storage 104.

Now, the function modules implemented by the programs stored in the main storage 102 are described.

The data transmission/reception module 111 controls data receiving processing and data transmitting processing. Specifically, the data transmission/reception module 111 receives, from client apparatuses 200, execution request of transaction processing, commit request of transaction processing and like. The data transmission/reception module 111 also transmits inquiries on data to other servers 100 and processing results to client apparatuses 200.

The server UAP 112 executes predetermined processing using the data stored in the data store 122. This embodiment is not limited to the processing executed by the server UAP 112.

The transaction control module 113 controls transaction processing using the data store 122. The transaction control module 113 serializes the plurality of pieces of transaction processing to be executed in parallel.

A piece of transaction processing includes one or more operations onto the data store 122. The operations onto the data store 122 include referencing operations and updating operations. A referencing operation is operation to execute data read process. An updating operation is operation to execute data update process. The data update process includes writing data, overwriting data, and deleting data. This embodiment treats writing data and overwriting data as the updating operation.

The transaction control module 113 includes an operation history management module 131. The operation history management module 131 generates results of each of the plurality of pieces of serialized transaction processing as operation histories 500 (see FIG. 3) and stores the plurality of operation histories 500 to operation history information 121 to be described later.

The transaction control module 113 does not actually execute transaction processing. In this embodiment, in order to apply the same status transition to the data stores 122 in the other servers 100, processing onto the data stores 122 is executed after the total order distribution modules 115 of each of the plurality of servers 100 determine the order of executing the plurality of pieces of transaction processing (the order of applying the plurality of operation histories 500) based on a distributed consensus algorithm.

The replication parallelism control module 114 manages an update status of the data store 122 updated by transaction processing. The replication parallelism control module 114 analyzes the plurality of operation histories 500 to determine whether any conflict exists in the plurality of pieces of transaction processing. The replication parallelism control module 114 instructs the data management module 116 to update the data store 122 based on an operation history 500 corresponding to a piece of transaction processing that does not conflict with any other transaction processing.

A conflict in the plurality of pieces of transaction processing can occur in the following cases, for example. If communication with a master managing some key range stops due to a network failure, the slave starts processing as a master. When the network failure is solved thereafter, the computer system includes a plurality of master servers managing the same key range. Each of the masters executes transaction processing on the same key range; accordingly, a conflict occurs in the plurality of pieces of transaction processing. Furthermore, a like conflict in the plurality of pieces of transaction processing occurs in the case where a master managing some key range is stopped in a scheduled maintenance work.

The replication parallelism control module 114 includes a version number control module 141, a conflict judgment module 142, and an operation history applying module 143.

The version number control module 141 controls the version number for indicating the update status of the data (master data) in the data store 122 managed by the server 100 as the master. Specifically, the version number control module 141 holds a version number and updates the version number after executing a piece of transaction processing. The update status of master data in the data store 122 can be identified with this version number. Each of the plurality of servers 100 independently manages the version number.

The conflict judgment module 142 determines whether any conflict exists in the plurality of pieces of transaction processing. A conflict in the plurality of pieces of transaction processing means an operation included in some transaction processing conflicts with an operation included in the other transaction processing. A conflict between operations means that processing on some key conflicts with other processing on the same key, and that an inconsistent data will occur.

In a case where a plurality of operations conflict, an inconsistent occurs in key-value data in the data stores 122. For example, when an operation history 500 for transaction processing including a referencing operation onto a key "A" and an operation history 500 for transaction processing including an updating operation onto the key "A" are transmitted from two different servers 100, the values read for the key "A" may be different depending on the order of executing the two pieces of transaction processing.

The operation history applying module 143 apply an operation history 500 (see FIG. 3) to the data store 122 if the conflict judgment module 142 has judged that the transaction processing corresponding to the operation history 500 does not conflict with any other transaction processing. Specifically, the operation history applying module 143 instructs the data management module 116 to operate the data store 122 in accordance with the operation history 500.

The version number control module 141, the conflict judgment module 142, and the operation history applying module 143 can be integrated into one or two modules. For example, the conflict judgment module 142 may have the functions of the version number control module 141.

The total order distribution module 115 determines the order of applying the plurality of operation histories 500 (the order of executing the plurality of pieces of transaction processing) and transmit the plurality of operation histories 500 together with the determined order of application.

The data management module 116 controls operations onto the data store 122 in accordance with instructions from the server UAP 112, the operation history applying module 143, and like.

The statistical information management module 117 manages the total number of pieces of accepted transaction processing and the total number of pieces of aborted transaction processing. In the following description, the total number of pieces of accepted transaction processing is also referred to as total acceptance number, the total number of pieces of aborted transaction processing as total abortion number. The processing executed by the statistical information management module 117 will be described in Embodiment 4.

Next, a client apparatus 200 are described. The client apparatus 200 includes a processor 201, a main storage 202, and a network interface 203, and transmits, to the servers 100, an execution request for transaction processing to execute various operations, and like. The client apparatus 200 is connected with a display 300.

The processor 201 executes programs stored in the main storage 202. Functions of the client apparatus 200 can be implemented by the processor 210 executing the programs. Hereinafter, processing described with sentences having a subject of a program represents that the program is being executed by the processor 201.

The main storage 202 stores programs to be executed by the processor 201 and information necessary for executing the programs. The main storage 202 can be a volatile memory or a non-volatile memory.

The main storage 202 in this embodiment stores programs for implementing a client UAP 211, a data transmission/reception module 212, and a display module 213. The network interface 203 is an interface for connecting the client apparatus 200 to other apparatuses via the network 350.

Now, the function modules implemented by the programs stored in the main storage 202 are described.

The client UAP 211 transmits an execution request of transaction processing to the server 100. Further, the client UAP 211 displays a result of transaction processing transmitted from the server 100 on the display 300.

The data transmission/reception module 212 controls data receiving processing and data transmitting processing. Specifically, the data transmission/reception module 212 transmits the execution request of transaction processing to the server 100 and receives the result of transaction processing from the server 100.

The display module 213 displays various information outputted from the server 100. Specifically, the display module 213 displays the total acceptance number and the total abortion number in each of the plurality of servers 100. The information to be displayed by the display module 213 will be described in Embodiment 4.

Figure 2:
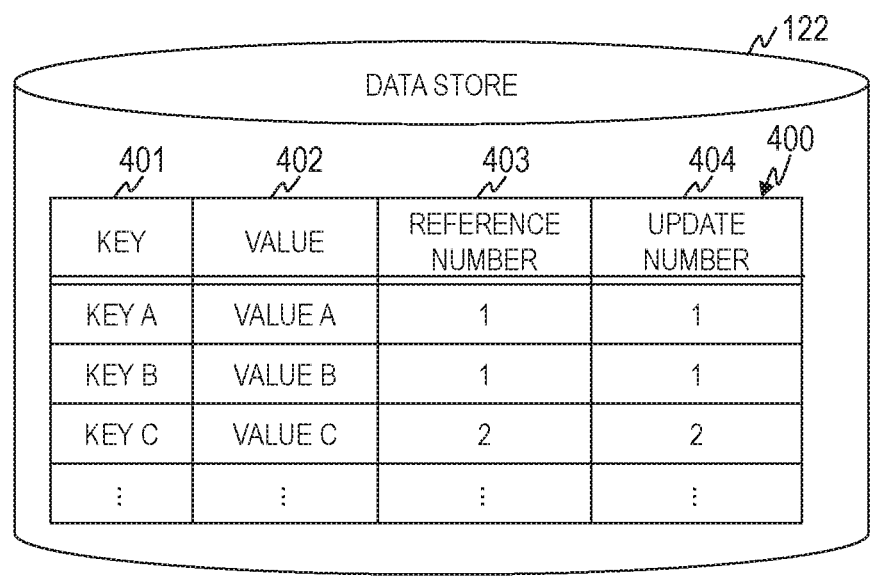
FIG. 2 is an explanatory diagram for illustrating a format of data stored in a data store according to Embodiment 1.

FIG. 2 is an explanatory diagram for illustrating a format of data stored in the data store 122 according to Embodiment 1.

The data store 122 in Embodiment 1 stores data management information 400. The data management information 400 includes a plurality of pieces of data each composed of a key, a value, and an operation number for managing the operation status of data by transaction processing. Hereinafter, data composed of the key, the value, and the operation number is also referred to as key-value data.

The data management information 400 includes one row for a piece of key-value data; each row includes a key 401, a value 402, a reference number 403, and an update number 404.

The key 401 stores identification information for identifying the data. The value 402 stores an actual value of the data.

The reference number 403 and the update number 404 are the operation number for managing the operation status of the data associated with the key 401 by transaction processing. The reference number 403 is an identification number for indicating the operation status (version) of the key-value data by the referencing operation included in the piece of transaction processing. The update number 404 is an identification number for indicating the operation status (version) of the key-value data by the updating operation included in the piece of transaction processing.

A user who operates a client apparatus 200 can save the key-value data to the distributed KVS by designating a key 401, and can also obtain the desired key-value data (a value 402 thereof) from the distributed KVS by designating a key 401.

Each of the plurality of servers 100 manages the key-value data by range of keys 401 (key range). In other words, the plurality of pieces of key-value data are distributed and allocated to the servers 100 depending on the key range. Each of the plurality of servers 100 executes processing as the master for the data included in the assigned key range. This configuration enables a large amount of data to be processed in parallel and at high speed.

It should be noted that the format of the data to be stored in the data store 122 is not limited to the format shown in FIG. 2. For example, the data to be stored in the data store 122 may have a format in which a hash value of a key, a value, and an operation number are associated with one another.

FIG. 3 is an explanatory diagram for illustrating an example of the operation history information 121 according to Embodiment 1.

The operation history information 122 stores one or more operation histories 500. The operation history 500 includes a commit number 510 and a key operation history 520.

The commit number 510 indicates the update status of the data (master data) in the data store 122 when the transaction control module 113 receives the commit request of transaction processing. The key operation history 520 indicates specifics of each of the plurality of operations included in the piece of transaction processing. The key operation history 520 includes a key 521, a value 522, and an operation type 523 on each row.

The key 521 is identification information on the key-value data to be operated. The value 522 is a value to be written or overwritten in the updating operation. The operation type 523 is the type of the operation. The operation type 523 stores either "read" or "write". The "read" represents the referencing operation of the key-value data and the "write" represents the updating operation of the key-value data.

Next, the processing to be executed by the server 100 is described. First, the outline of the processing executed by the server 100 is provided.

(1) In a case of receiving an execution request of transaction processing from the client UAP 211 and like, the server UAP 112 of the server 100 issues a transaction including one or more operations. The transaction control module 113 generates an operation history 500 based on the issued transaction. Furthermore, the total order distribution module 115 transmits the operation history 500 to the total order distribution modules 115 of the other servers 100.

(2) The total order distribution module 115 determines the order of executing a plurality of pieces of transaction processing each of which corresponds to a plurality of received operation histories 500. Furthermore, the total order distribution module 115 outputs the plurality of operation histories 500 to the replication parallelism control module 114.

(3) The replication parallelism control module 114 determines, for each of the plurality of pieces of transaction processing, whether a piece of transaction processing conflicts with any other transaction processing. The replication parallelism control module 114 also applies an operation history 500 of a piece of transaction processing which does not conflict with any other transaction processing.

Figure 4:
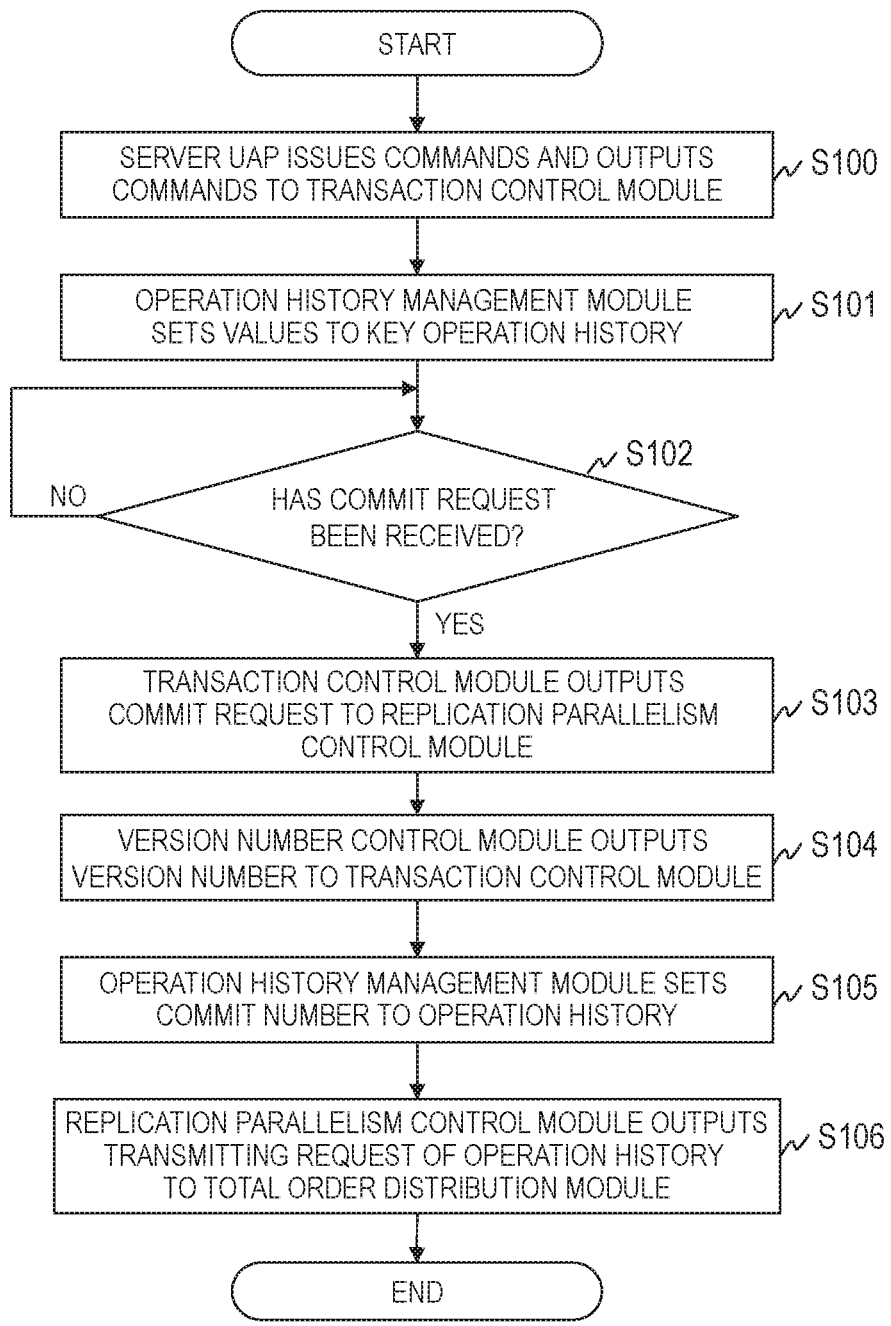
FIG. 4 is a flowchart for explaining processing executed by a server according to Embodiment 1.

FIG. 4 is a flowchart for explaining processing executed by the server 100 according to Embodiment 1. FIG. 4 illustrates process after receiving an execution request of transaction processing until transmitting an operation history 500.

The server 200 starts the processing as follows, in a case of receiving the execution request of transaction processing from the client apparatus 200 and like.

The server UAP 112 issues commands for the operations based on the execution request of transaction processing from the client apparatus 200 and like, and outputs the issued commands to the transaction control module 113 (Step S100). At this step, a specific number of commands are treated as a piece of transaction processing to be processed based on the execution request of transaction processing.

The operation history management module 131 of the transaction control module 113 adds a row to the key operation history 520 for each command, and sets values included in the command to the key 521, the value 522, and the operation type 523 on each row (Step S101).

The transaction control module 113 determines whether the commit request has been received (Step S102). Specifically, the client UAP 211 transmits the commit request to the server 100 and the server UAP 112 receives the commit request. Further, the server UAP 112 outputs the commit request to the transaction control module 113.

In a case where it is determined that the commit request has not been received, the transaction control module 113 keeps waiting until receiving the commit request from the server UAP 112.

In a case where it is determined that the commit request has been received, the transaction control module 113 outputs the commit request to the replication parallelism control module 114 (Step S103).

In a case of receiving the commit request, the version number control module 141 of the replication parallelism control module 114 outputs the version number currently held by the version number control module 141 to the transaction control module 113 (Step S104).

The operation history management module 131 of the transaction control module 113 sets the version number received from the version number control module 141 to the commit number 510 (Step S105).

The replication parallelism control module 114 outputs a transmitting request of the operating history 500 to the total order distribution module 115 (Step S106) and terminates the processing.

The total order distribution module 115 determines the order of applying the plurality of operation histories 500 to the data store 122 with the total order distribution modules 115 of the other servers 100 based on a distributed consensus algorithm. In this operation, the total order distribution module 115 sets a sequence number in the order of applying the plurality of operation histories 500 and then transmits the operation history 500 to the other servers. The total order distribution module 115 further outputs the operation history 500 transmitted to the total order distribution modules 115 of the other servers 100 to the local replication parallelism control module 114 in the same server 100. The total order distribution module 115 also outputs the plurality of operation histories 500 received from the total order distribution modules 115 of the other servers 100 to the local replication parallelism control module 114 in the same server 100.

Figure 5A:
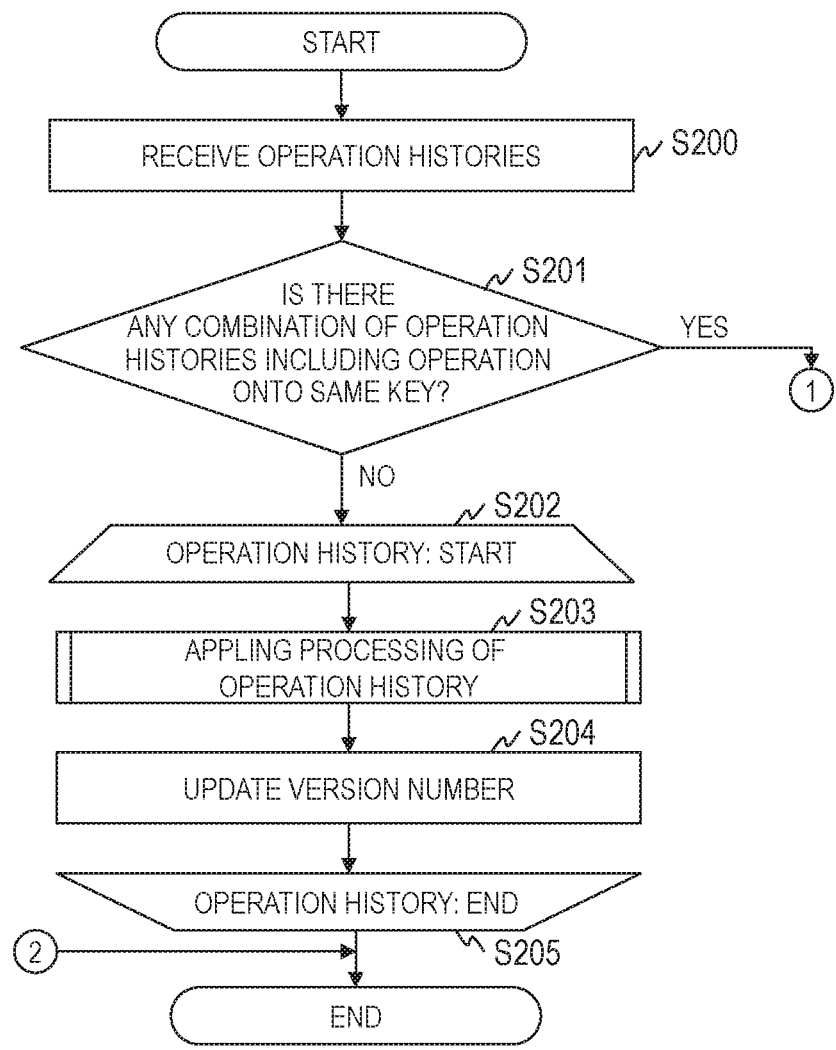
FIGS. 5A and 5B are flowcharts for explaining processing executed by the server according to Embodiment 1.
Figure 5B:
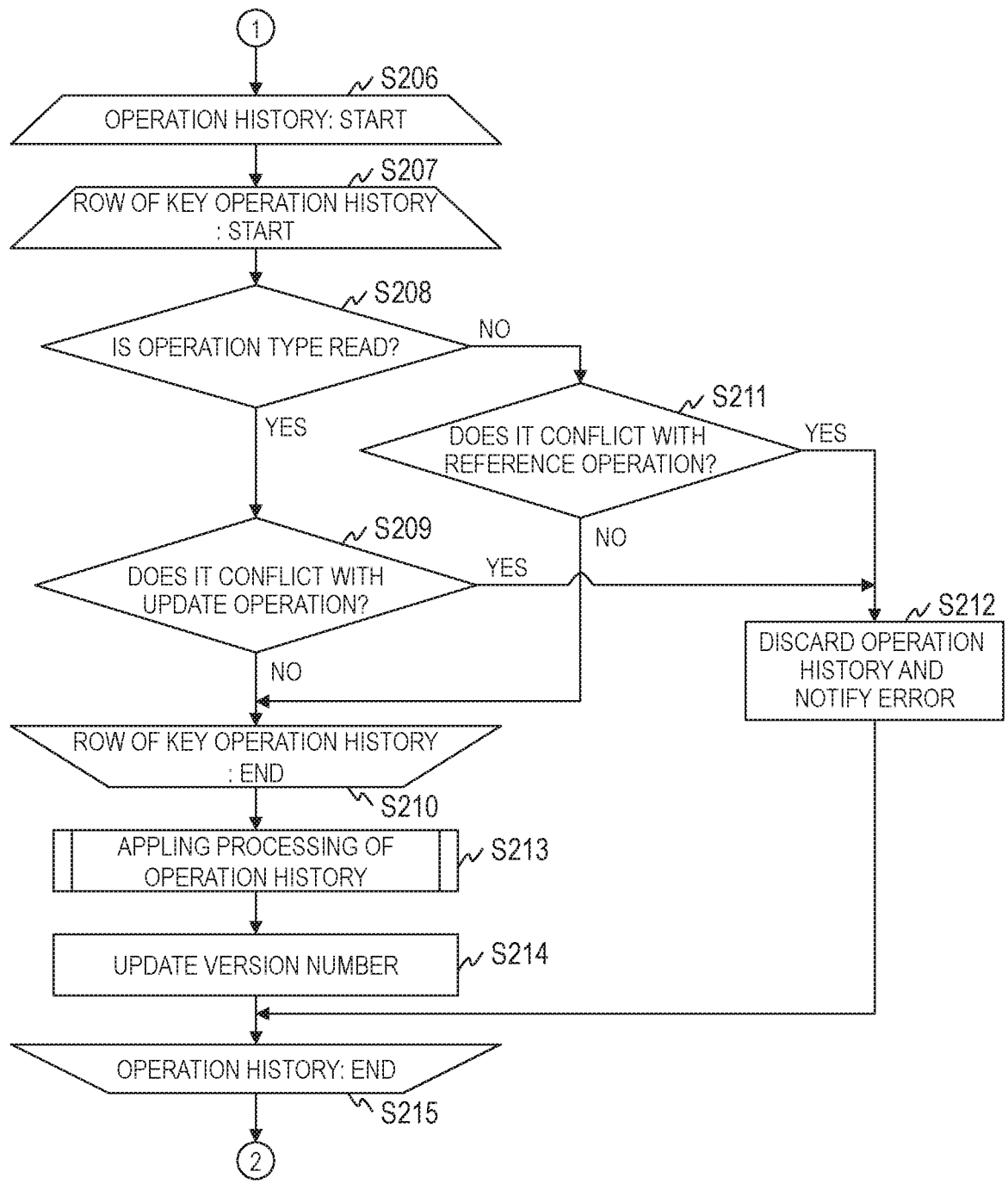

FIGS. 5A and 5B are flowcharts for explaining processing executed by the server 100 according to Embodiment 1. FIGS. 5A and 5B illustrate the processing from receiving the plurality of operation histories 500 until applying the plurality of operation histories 500.

The processing described hereinafter is executed after the total order distribution module 115 outputs the plurality of operation histories 500 for which the order of execution has been determined to the replication parallelism control module 114.

The replication parallelism control module 114 receives the plurality of operation histories 500 (Step S200). The replication parallelism control module 114 in this embodiment executes this processing in the case of receiving the plurality of operation histories 500 within a predetermined period as well as the case of receiving the plurality of operation histories 500 at once.

In this example, the replication parallelism control module 114 starts a timer upon receipt of the first operation history 500 and waits for the operation history 500 for a predetermined period. After elapse of the predetermined period, the replication parallelism control module 114 resets the timer and proceeds to Step S201. The period for receiving the operation history 500 can be set as appropriate by the administrator of the server 100.

The conflict judgment module 142 of the replication parallelism control module 114 determines whether there exists any combination of operation histories 500 corresponding to transaction processing including an operation onto the same key (Step S201). For example, the following processing is executed.

The conflict judgment module 142 selects one operation history 500 in accordance with the order of executing the plurality of operation histories 500. The conflict judgment module 142 obtains a reference key from the keys 521 in the key operation history 520 of the selected operation history 500.

The conflict judgment module 142 refers the key operation histories 520 in each a plurality of operation histories 500 to be executed after the selected operation history 500 and determines whether any row whose the key 521 stores identification information corresponds to the obtained reference key.

In a case where the row whose the key 521 stores identification information corresponds to the obtained reference key exists, the conflict judgment module 142 determines that there exists the combination of operation histories 500 corresponding to transaction processing including the operation onto the same key.

The conflict judgment module 142 repeats the same processing on the remaining operation histories 500. The foregoing is an example of the processing of Step S201.

In a case where it is determined that there is no combination of operation histories 500 corresponding to transaction processing including the operation onto the same key, the replication parallelism control module 114 starts loop processing on the plurality of operation histories 500 (Step S202). Specifically, the operation history applying module 143 of the replication parallelism control module 114 selects one operation history 500 in accordance with the order of executing the plurality of operation histories 500.

The operation history applying module 143 executes applying processing of the selected operation history 500 (Step S203). The details of the applying processing of the operation history 500 will be described later using FIG. 6.

After completion of the applying processing of the operation history 500, the version number control module 141 of the replication parallelism control module 114 updates the version number (Step S204). Specifically, the version number control module 141 adds "1" to the current version number.

The replication parallelism control module 114 determines whether the processing has been completed on all the received operation histories 500 (Step S205).

In case where the processing has not been completed on all the received operation histories 500, the replication parallelism control module 114 returns to Step S202 and executes the same processing. In a case where the processing has been completed on all the received operation histories 500, the replication parallelism control module 114 terminates the processing.

In Step S201, in a case where it is determined that there exists at least one combination of operation histories 500 corresponding to transaction processing including the operation on the same key, the replication parallelism control module 114 starts loop processing on the plurality of operation histories 500 (Step S206). The processing at Steps S206 and S215 are the same as the processing at Steps S202 and S205.

The conflict judgment module 142 of the replication parallelism control module 114 starts loop processing on the plurality of rows included in the key operation history 520 of the selected operation history 500 (Step S207). Specifically, the conflict judgment module 142 selects one row from the key operation history 520. In this example, the rows are selected one by one from the top row.

The conflict judgment module 142 of the replication parallelism control module 114 determines whether the operation type 523 of the selected row is "read" (Step S208).

In a case where it is determined that the operation type 523 of the selected row is "read", the conflict judgment module 142 determines whether the referencing operation corresponding to this row conflicts with any updating operations included in the other transaction processing (Step S209). Specifically, the following processing is executed.

The conflict judgment module 142 instructs the data management module 116 to read the value of the update number 404 of the key-value data corresponding to the key 521 of the selected row. The conflict judgment module 142 determines whether the commit number 510 of the selected operation history 500 is larger than the read value of the update number 404.

In a case where the value of the commit number 510 is larger than the value of the update number 404, the conflict judgment module 142 determines that the referencing operation corresponding to the selected row does not conflict with any updating operations included in the other transaction processing. In a case where the value of the commit number 510 is equal to or smaller than the value of the update number 404, the conflict judgment module 142 determines that the referencing operation corresponding to the selected row conflicts with updating operation(s) included in the other transaction processing. The foregoing is the explanation of the processing at Step S209.

In a case where it is determined that the referencing operation corresponding to the selected row does not conflict with any updating operations included in the other transaction processing, the conflict judgment module 142 of the replication parallelism control module 114 determines whether the processing has been completed on all the rows included in the key operation history 520 of the selected operation history 500 (Step S210).

In a case where it is determined that processing has not been completed on all the rows included in the key operation history 520 of the selected operation history 500, the replication parallelism control module 114 returns to Step S207 and executes the same processing. In a case where it is determined that processing has been completed on all the rows included in the key operation history 520 of the selected operation history 500, the replication parallelism control module 114 proceeds to Step S213.

In Step S208, it is determined that the operation type 523 of the selected row is "write", the conflict judgment module 142 determines whether the updating operation corresponding to the row conflicts with any referencing operations included in the other transaction processing (Step S211). Specifically, the following processing is executed.

The conflict judgment module 142 instructs the data management module 116 to read the value of the reference number 403 of the key-value data corresponding to the key 521 of the selected row. The conflict judgment module 142 determines whether the commit number 510 of the selected operation history 500 is larger than the read value of the reference number 403.

In a case where the value of the commit number 510 is larger than the value of the reference number 403, the conflict judgment module 142 determines that the updating operation corresponding to the selected row does not conflict with any referencing operations included in the other transaction processing. On the other hand, in a case where the value of the commit number 510 is equal to or smaller than the value of the reference number 403, the conflict judgment module 142 determines that the updating operation corresponding to the selected row conflicts with referencing operation(s) included in the other transaction processing. The foregoing is the explanation of the processing at Step S211.

In a case where it is determined that the updating operation corresponding to the selected row does not conflict with any referencing operations included in the other transaction processing, the conflict judgment module 142 of the replication parallelism control module 114 determines whether the processing has been completed on all the rows included in the key operation history 520 of the selected operation history 500 (Step S210).

In Step S209, in a case where it is determined that the referencing operation corresponding to the selected row conflicts with updating operation(s) included in the other transaction processing, or in Step S211, in a case where it is determined that the updating operation corresponding to the selected row conflicts with referencing operation(s) included in the other transaction processing, the conflict judgment module 142 of the replication parallelism control module 114 discards the selected operation history 500 and notifies an error to the client apparatus 200 (Step S212). Thereafter, the replication parallelism control module 114 proceeds to Step S215. In discarding the selected operation history 500, the conflict judgment module 142 deletes the selected operation history 500 from the operation history information 121. The conflict judgment module 142 may execute only either one of the discarding the operation history 500 and the notifying the error.

In Step S210, in a case where it is determined that the processing has been completed on all the rows included in the key operation history 520 of the selected operation history 500, the operation history applying module 143 of the replication parallelism control module 114 executes applying processing of the selected operation history 500 (Step S213). The processing at Step S213 is the same as the processing at Step S203.

The version number control module 141 of the replication parallelism control module 114 updates the version number after completion of the applying processing of the operation history 500. The processing at Step S214 is the same as the processing at Step S204.

The replication parallelism control module 114 determines whether the processing has been completed on all the received operation histories 500 (Step S215).

In a case where it is determined that the processing has not been completed on all the received operation histories 500, the replication parallelism control module 114 returns to Step S206 and executes the same processing. In a case where it is determined that the processing has been completed on all the received operation histories 500, the replication parallelism control module 114 terminates the processing.

In a case where the received by the replication parallelism control module 114 is one operation history 500, the replication parallelism control module 114 executes applying processing of the operation history (Step S203), updates the version number (Step S204), and thereafter, terminates the processing.

Figure 6:
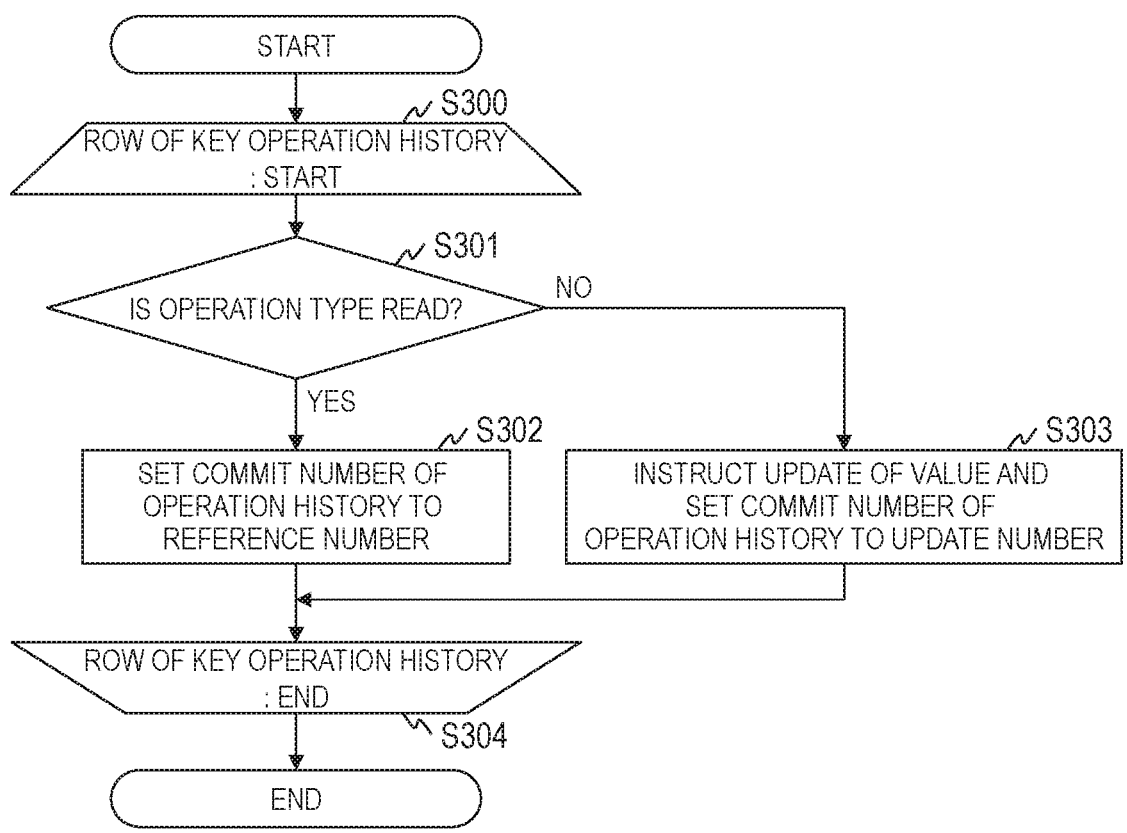
FIG. 6 is a flowchart for explaining applying processing of an operation history, which is to be executed by an operation history applying module of a replication parallelism control module according to Embodiment 1.

FIG. 6 is a flowchart for explaining the applying processing of the operation history 500, which is to be executed by the operation history applying module 143 of the replication parallelism control module 114 according to Embodiment 1.

The operation history applying module 143 starts loop processing on the plurality of rows included in the key operation history 520 of the selected operation history 500 (Step S300). Specifically, the operation history applying module 143 selects one row from the key operation history 520. In this example, the rows are selected one by one from the top row.

The operation history applying module 143 determines whether the operation type 523 of the selected row is "read" (Step S301).

In a case where it is determined that the operation type 523 of the selected row is "read", the operation history applying module 143 instructs the data management module 116 to set the value of the commit number 510 to the reference number 403 of the key-value data corresponding to the key 521 (Step S302). Thereafter, the operation history applying module 143 terminates the applying processing of the operation history 500.

In a case where it is determined that the operation type 523 of the selected row is "write", the operation history applying module 143 instructs the data management module 116 to update the value of the key-value data corresponding to the key 521 and set the value of the commit number 510 to the update number 404 of the same key-value data (Step S303). Thereafter, the operation history applying module 143 terminates the applying processing of the operation history 500.

The operation history applying module 143 determines whether the processing has been completed on all the rows included in the key operation history 520 of the selected operation history 500 (Step S304).

In a case where it is determined that the processing has not been completed on all the rows included in the key operation history 520 of the selected operation history 500, the operation history applying module 143 returns to Step S300 and executes the same processing. In a case where it is determined that the processing has been completed on all the rows included in the key operation history 520 of the selected operation history 500, the operation history applying module 143 terminates the applying processing of the operation history 500. In this time, the operation history applying module 143 deletes the selected operation history 500 from the operation history information 121.

Although the replication parallelism control module 114 starts the timer upon receipt of an operation history 500, the replication parallelism control module 114 does not need to use the timer. In this case, the replication parallelism control module 114 executes the processing from Step S206 to Step S215 after receiving the plurality of operation histories 500 (Step S200). In other words, the processing from Step S201 to Step S205 is omitted.

According to Embodiment 1, the replication parallelism control module 114 updates the data store 122 based on the operation history 500 in a case where all the operations included in a piece of transaction processing conflicts with the operations included in the other transaction processing. On the other hand, in a case where at least one operation included in a piece of transaction processing conflicts with operation(s) in the other transaction processing, the replication parallelism control module 114 discards the operation history 500.

Therefore, even in a case where each of a plurality of masters executes transaction processing in the computer system, transaction processing that does not conflict with any of the other transaction processing is executed; accordingly, the availability of the distributed KVS can be increased while the integrity of data, i.e. the consistency in the distributed KVS is guaranteed.

Embodiment 2

In Embodiment 1, the conflict judgment module 142 determines whether each operation onto one key conflicts with any operations included in the other transaction processing. In Embodiment 2, the conflict judgment module 142 determines whether each operation onto a key group which is a set of keys conflicts with any operations included in the other transaction processing. Hereinafter, Embodiment 2 is described, focusing on the differences from Embodiment 1.

The configuration of the computer system in Embodiment 2 is the same as the configuration of the computer system in Embodiment 1; accordingly, the explanation thereof is omitted. The processing from receiving the execution request of transaction processing until transmitting the operation history 500 is the same as the processing in Embodiment 1; accordingly, the explanation thereof is omitted. Embodiment 2 is different from Embodiment 1 in the point that an operation history 500 including the plurality of group unit operations is generated.

FIG. 7 is an explanatory diagram for illustrating a format of data stored in the data store 122 according to Embodiment 2.

The data management information 400 stored in the data store 122 newly includes a group ID 405 on each row. The group ID 405 stores identification information on a group composed of a plurality of keys.

Managing the operations by group unit simplifies exclusion control, for example. The definition of each group is preset to each of the plurality of servers 100. For example, each of the plurality of servers 100 holds definition information in which identification information on the group is associated with the plurality of keys included in the group.

FIG. 8 is an explanatory diagram for illustrating an example of the group access information 123 according to Embodiment 2.

The group access information 123 includes a group ID 601, an SIR (Store Intent Read) 602, an SIW (Store Intent Write) 603, an SR (Store Read) 604, and an SW (Store Write) 605 on each row. The group ID 601 is same as the group ID 405.

The SIR 602, SIW 603, SR 604, and SW 605 are the operation number for managing the operation status of the group operated by transaction processing.

The SIR 602 is an identification number for indicating the operation status (version) of the key-value data operated by a referencing operation onto the key-value data under a part of the keys included in the group. The SIW 603 is an identification number for indicating the operation status (version) of the key-value data operated by an updating operation onto the key-value data under a part of the keys included in the group.

The SR 604 is an identification number for indicating the operation status (version) of the key-value data operated by a referencing operation onto the key-value data under all the keys included in the group. The SW 605 is an identification number for indicating the operation status (version) of the key-value data operated by an updating operation onto the key-value data under all the keys included in the group.

Figure 9:
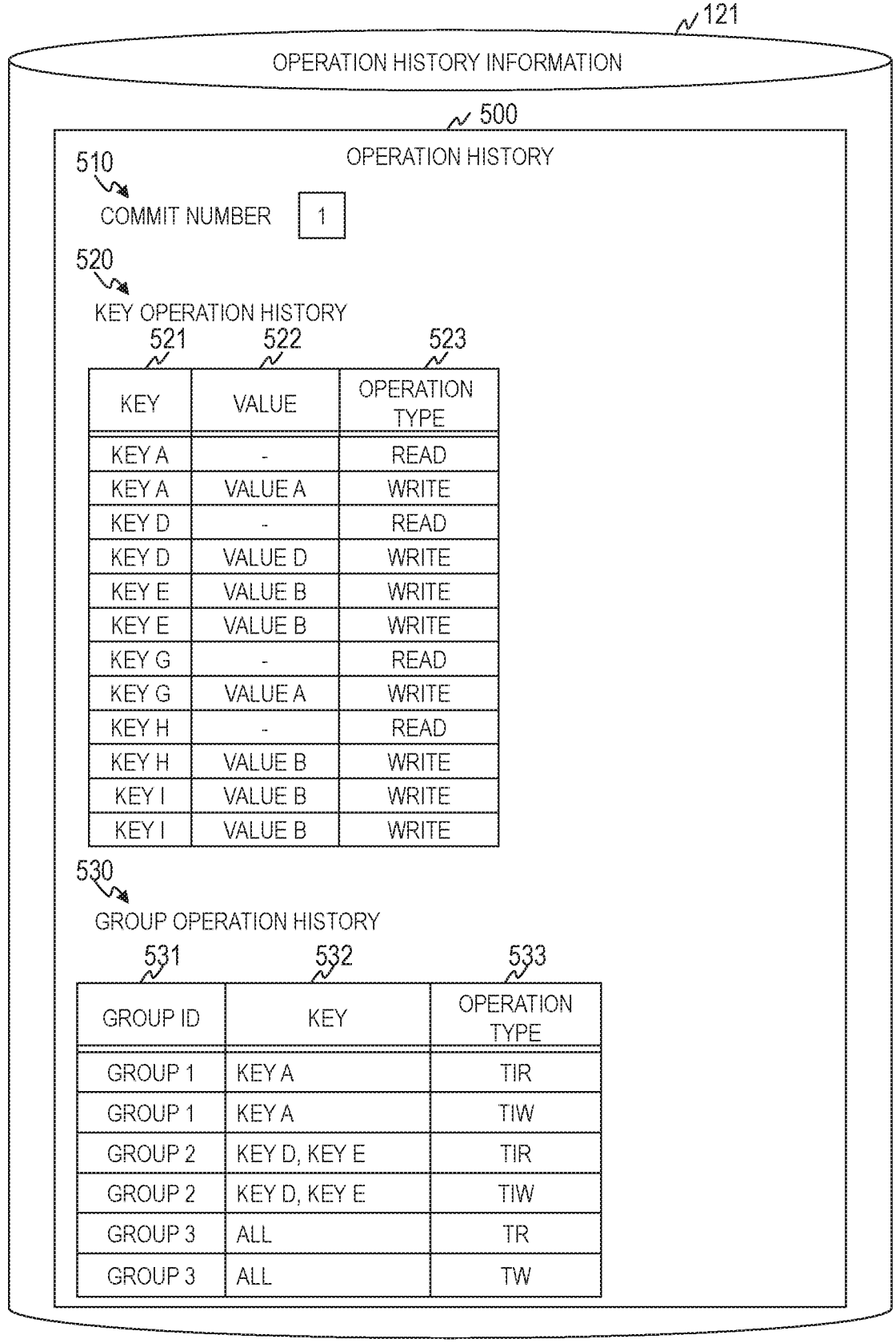
FIG. 9 is an explanatory diagram for illustrating an example of the operation history information according to Embodiment 2.

FIG. 9 is an explanatory diagram for illustrating an example of the operation history information 121 according to Embodiment 2.

The operation history 500 in Embodiment 2 is different from the operation history 500 in Embodiment 1 in the point that the operation history 500 includes a group operation history 530. The group operation history 530 includes a group ID 531, a key 532, and an operation type 533 on each row.

The group ID 531 is same as the group ID 405. The key 532 store the keys included in the group. The operation type 533 is the type of operation onto the group. The operation type 533 stores one of TIR (Transaction Intent Read), TIW (Transaction Intent Write), TR (Transaction Read), and TW (Transaction Write).

The TIR represents a referencing operation onto part of the plurality of pieces of key-value data included in the group; the TIW represents an updating operation onto part of the plurality of pieces of key-value data included in the group; the TR represents a referencing operation onto all the key-value data included in the group; and the TW represents an updating operation onto all the key-value data included in the group.

Figure 10A:
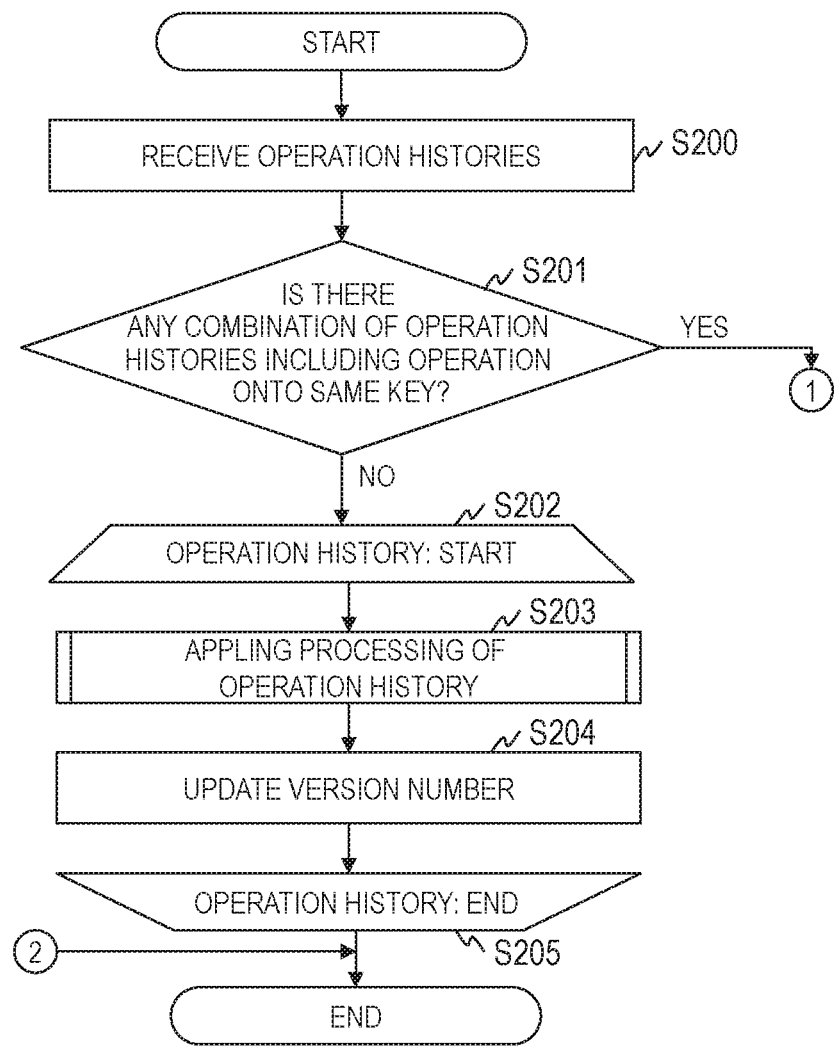
FIGS. 10A and 10B are flowcharts for explaining processing executed by the server according to Embodiment 2.
Figure 10B:
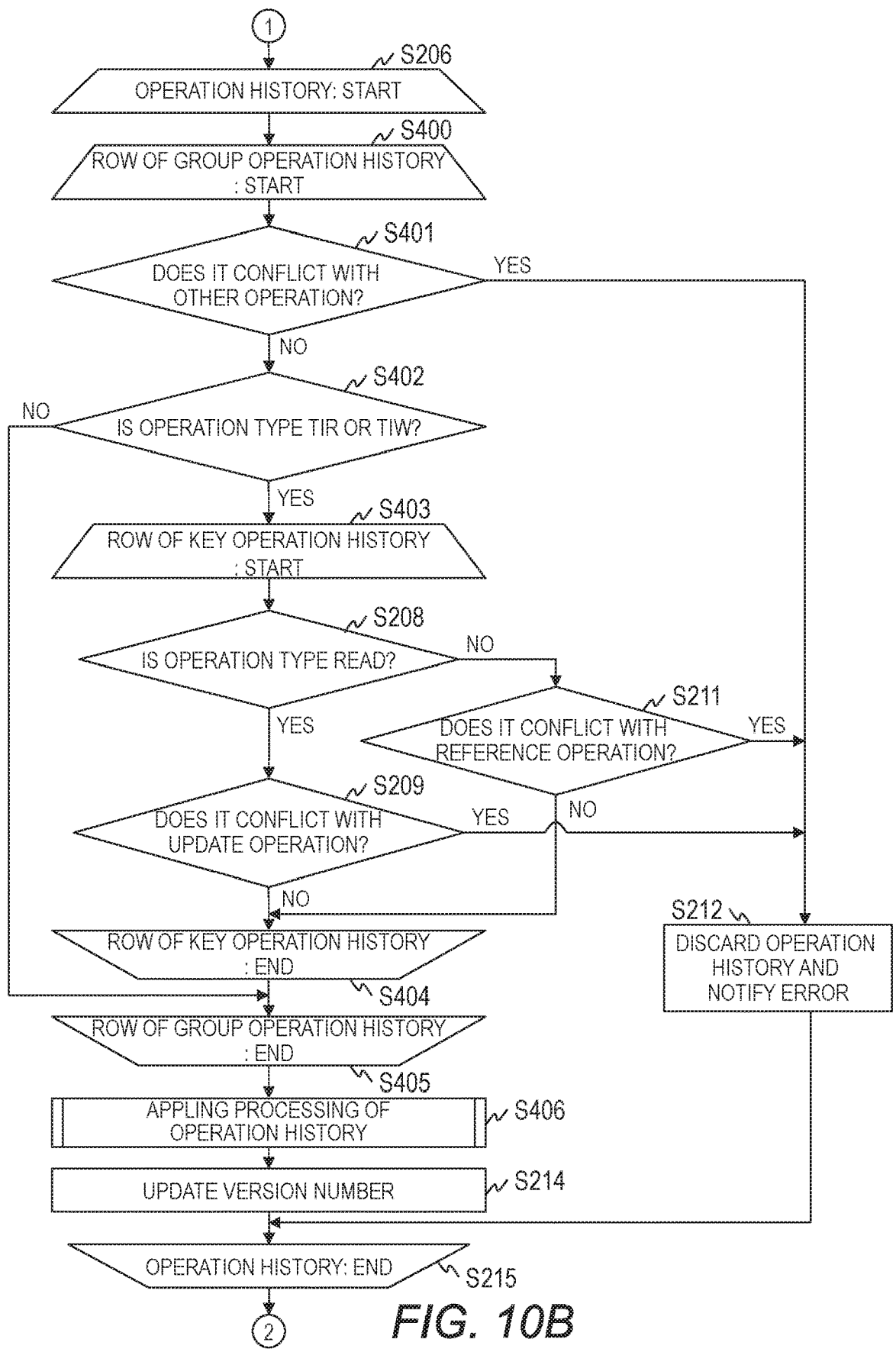

FIGS. 10A and 10B are flowcharts for explaining processing executed by the server 100 according to Embodiment 2. FIGS. 10A and 10B illustrate the processing from receiving the plurality of operation histories 500 until applying the plurality of operation histories 500.

The processing described hereinafter is executed after the total order distribution module 115 outputs the plurality of operation histories 500 to the replication parallelism control module 114. The processing from Step S200 to Step S205 is the same as the processing in Embodiment 1.

In Step S201, in a case where it is determined that there exists at least one combination of operation histories 500 corresponding to transaction processing including the operation on the same key, the replication parallelism control module 114 starts loop processing on the plurality of operation histories 500 (Step S206). The processing at Step S206 is the same as the processing in Embodiment 1.

The conflict judgment module 142 of the replication parallelism control module 114 starts loop processing on the plurality of rows included in the group operation history 530 of the selected operation history 500 (Step S400). Specifically, the operation history applying module 143 selects one row from the group operation history 530. In this example, the rows are selected one by one from the top row.

The conflict judgment module 142 of the replication parallelism control module 114 determines whether the group unit operation corresponding to the selected row conflicts with any operations included in the other transaction processing (Step S401). Specifically, the following processing is executed.

The conflict judgment module 142 identifies the type of the group unit operation with reference to the operation type 533 of the selected row.

In a case where the operation type 533 is "TIR", the conflict judgment module 142 searches the row, from the group access information 123, whose the group ID 601 is the same value as the group ID 531 on the selected row and reads the value of the SW 605 on the searched row. The conflict judgment module 142 determines whether the value of the commit number 510 of the selected operation history 500 is larger than the value of the SW 605. In a case where it is determined that the value of the commit number 510 is larger than the value of the SW 605, the conflict judgment module 142 determines that the group unit operation corresponding to the selected row does not conflict with any operations included in the other transaction processing.

In a case where the operation type 533 is "TIW", the conflict judgment module 142 searches the row, from the group access information 123, whose the group ID 601 is the same value as the group ID 531 on the selected row and reads the values of the SR 604 and the SW 605 on the searched row. The conflict judgment module 142 determines whether the value of the commit number 510 of the selected operation history 500 is larger than both of the values of the SR 604 and the SW 605. In a case where this condition is satisfied, the conflict judgment module 142 determines that the group unit operation corresponding to the selected row does not conflict with any operations included in the other transaction processing.

In a case where the operation type 533 is "TR", the conflict judgment module 142 searches the row, from the group access information 123, whose the group ID 601 is the same value as the group ID 531 on the selected row and reads the values of the SIW 603 and the SW 605 on the searched row. The conflict judgment module 142 determines whether the value of the commit number 510 of the selected operation history 500 is larger than both of the values of the SIW 603 and the SW 605. In a case where this condition is satisfied, the conflict judgment module 142 determines that the group unit operation corresponding to the selected row does not conflict with any operations included in the other transaction processing.

In a case where the operation type 533 is "TW", the conflict judgment module 142 searches the row, from the group access information 123, whose the group ID 601 is the same value as the group ID 531 on the selected row and reads the values of the SIR 602, the SIW 603, the SR 604, and the SW 605 on the searched row. The conflict judgment module 142 determines whether all the following four conditions are satisfied.

Condition 1: The value of the commit number 510 of the selected operation history 500 is larger than the value of the SIR 602. Condition 2: The value of the commit number 510 of the selected operation history 500 is larger than the value of the SIW 603. Condition 3: The value of the commit number 510 of the selected operation history 500 is larger than the value of the SR 604. Condition 4: The value of the commit number 510 of the selected operation history 500 is larger than the value of the SW 605.

In a case where all of the foregoing four conditions are satisfied, the conflict judgment module 142 determines that the group unit operation corresponding to the selected row does not conflict with any operations included in the other transaction processing. The foregoing is the explanation on the processing at Step S401.

In a case where it is determined that the group unit operation corresponding to the selected row conflicts with operation(s) included in the other transaction processing, the conflict judgment module 142 of the replication parallelism control module 114 discards the selected operation history 500 and notifies the error to the client apparatus 200 (Step S212). Thereafter, the replication parallelism control module 114 proceeds to Step S215. In discarding the selected operation history 500, the conflict judgment module 142 deletes the selected operation history 500 from the operation history information 121. The conflict judgment module 142 may execute only either one of the discarding the operation history 500 and the notifying the error.

In a case where it is determined that the group unit operation onto corresponding to the selected row does not conflict with any operations included in the other transaction processing, the conflict judgment module 142 of the replication parallelism control module 114 determines whether the operation type 533 of the selected row is either "TIR" or "TIW" (Step S402). In a case where the operation type 533 is "TIR" or "TIW", the plurality of pieces of key-value data associated with a part of the keys included in the group are to be operated; accordingly, it is necessary to determine whether any conflict exists in the operations onto individual keys. Accordingly, the conflict judgment module 142 executes determination processing at Step S402.

In a case where determining that the operation type 533 of the selected row is neither "TIR" nor "TIW", the conflict judgment module 142 of the replication parallelism control module 114 determines whether processing has been completed on all the rows included in the group operation history 530 of the selected operation history 500 (Step S405).

In a case where it is determined that processing has not been completed on all the rows included in the group operation history 530 of the selected operation history 500, the conflict judgment module 142 of the replication parallelism control module 114 returns to Step S400 and executes the same processing.

In a case where it is determined that processing has been completed on all the rows included in the group operation history 530 of the selected operation history 500, the conflict judgment module 142 of the replication parallelism control module 114 proceeds to Step S406.

In Step S402, in a case where it is determined that the operation type 533 of the selected row is either "TIR" or "TIW", the conflict judgment module 142 of the replication parallelism control module 114 starts loop processing on the key operation history 520 of the selected operation history 500 (Step S403). Specifically, the conflict judgment module 142 selects one key from the keys 532 on the selected row and further, extracts the rows corresponding to the selected key from the key operation history 520. Furthermore, the conflict judgment module 142 selects one row from the extracted rows. In this example, the rows are selected one by one from the top row.

The processing on the row selected from the key operation history 520, which corresponds to Steps S208, S209, S211, and S212, is the same as the processing in Embodiment 1.

In Step S209, in a case where it is determined that the referencing operation corresponding to the selected row does not conflict with any updating operations included in the other transaction processing, or in Step S211, in a case where it is determined that the updating operation corresponding to the selected row does not conflict with any referencing operations included in the other transaction processing, the conflict judgment module 142 of the replication parallelism control module 114 determines whether processing has been completed on all the rows extracted from the key operation history 520 of the selected operation history 500 (Step S404).

In a case where it is determined that processing has not been completed on all the rows extracted from the key operation history 520 of the selected operation history 500, the conflict judgment module 142 of the replication parallelism control module 114 returns to Step S403 and executes the same processing.

In a case where it is determining that processing has been completed on all the rows extracted from the key operation history 520 of the selected operation history 500, the conflict judgment module 142 of the replication parallelism control module 114 proceeds to Step S405.

In Step S405, in a case where it is determined that the processing has been completed on all the rows included in the group operation history 530 of the selected operation history 500, applying processing of the operation history 500 is executed based on the key operation history 520 of the selected operation history 500 (Step S406). The processing at Step S406 is different from the processing in Embodiment 1. The details of the applying processing of the operation history 500 will be described later with reference to FIG. 11.

The version number control module 141 of the replication parallelism control module 114 updates the version number after completion of the applying processing of the operation history 500 (Step S214). The replication parallelism control module 114 determines whether processing has been completed on all the received operation histories 500 (Step S215).

In a case where it is determined that the processing has not been completed on all the received operation histories 500, the replication parallelism control module 114 returns to Step S206 and executes the same processing. In a case where it is determined that the processing has been completed on all the received operation histories 500, the replication parallelism control module 114 terminates the processing.

Figure 11:
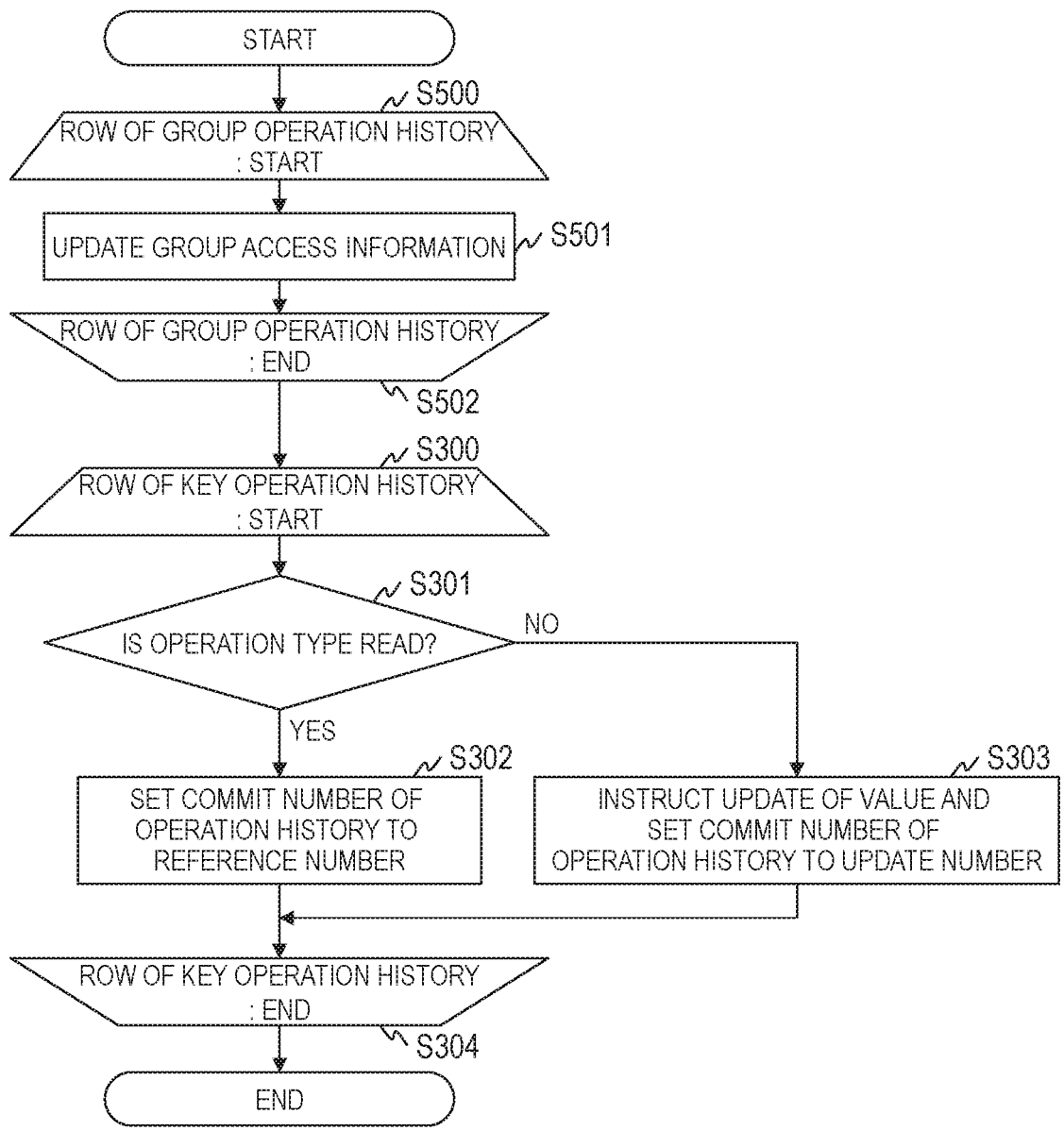
FIG. 11 is a flowchart for explaining the applying processing of the operation history executed by the operation history applying module of the replication parallelism control module according to Embodiment 2.

FIG. 11 is a flowchart for explaining the applying processing of the operation history 500 executed by the operation history applying module 143 of the replication parallelism control module 114 according to Embodiment 2.

The operation history applying module 143 starts loop processing on the plurality of rows included in the group operation history 530 of the selected operation history 500 (Step S500). Specifically, the operation history applying module 143 selects one row from the group operation history 530. In this example, the rows are selected one by one from the top row.

The operation history applying module 143 updates the group access information 123 based on the selected row (Step S501). Specifically, the following processing is executed.

The operation history applying module 143 refers the operation type 533 of the selected row to identify the type of the group unit operation.

In a case where the operation type 533 is "TIR", the operation history applying module 143 sets the value of the commit number 510 to the SIR 602 on the row whose the value of the group ID 601 is same as the value of the group ID 531 on the selected row.

In a case where the operation type 533 is "TIW", the operation history applying module 143 sets the value of the commit number 510 to the SIW 603 on the row whose the value of the group ID 601 is same as the value of the group ID 531 on the selected row.

In a case where the operation type 533 is "TR", the operation history applying module 143 sets the value of the commit number 510 to the SR 604 on the row whose the value of the group ID 601 is same as the value of the group ID 531 on the selected row.

In a case where the operation type 533 is "TW", the operation history applying module 143 sets the value of the commit number 510 to the SW 605 on the row whose the value of the group ID 601 is same as the value of the group ID 531 on the selected row. The foregoing is the explanation of the processing at Step S501.

The operation history applying module 143 determines whether the processing is completed on all the rows of the group operation history 530 in the selected operation history 500 (Step S502).

In a case where it is determined that the processing has not been completed on all the rows included in the group operation history 530 of the selected operation history 500, the operation history applying module 143 returns to Step S500 and executes the same processing.

In a case where it is determined that the processing has been completed on all the rows included in the group operation history 530 of the selected operation history 500, the operation history applying module 143 proceeds to Step S300. The processing from Step S300 to Step S304 is the same as the processing in Embodiment 1.

According to Embodiment 2, the replication parallelism control module 114 can determine whether any conflict exists in transaction processing even though the transaction processing includes a group unit operation. Accordingly, Embodiment 2 increases the availability of the distributed KVS while guaranteeing the consistency in the distributed KVS.

Embodiment 3

Embodiment 3 is different from Embodiment 1 in the point of determining whether any conflict of update operations exists in the plurality of pieces of transaction processing. Hereinafter, Embodiment 3 is described, focusing on the differences from Embodiment 1.

The configuration of the computer system in Embodiment 3 is the same as the configuration of the computer system in Embodiment 1; accordingly, the explanation thereof is omitted. The operation history information 121 and the data store 122 are the same as those in Embodiment 1; accordingly, the explanation thereof is omitted. Further, the processing from receiving the execution request of transaction processing until transmitting the operation history 500 is the same as the processing in Embodiment 1; accordingly, the explanation thereof is omitted.

Figure 12A:
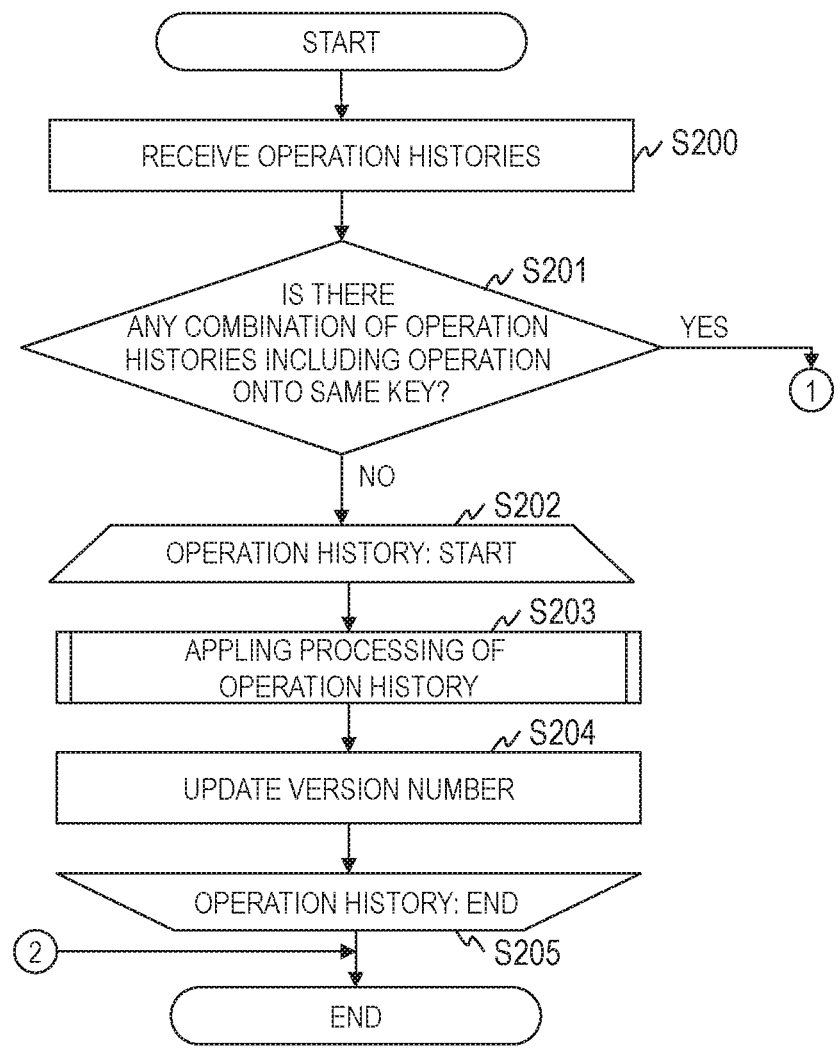
FIGS. 12A and 12B are flowcharts for explaining processing executed by the server according to Embodiment 3.
Figure 12B:
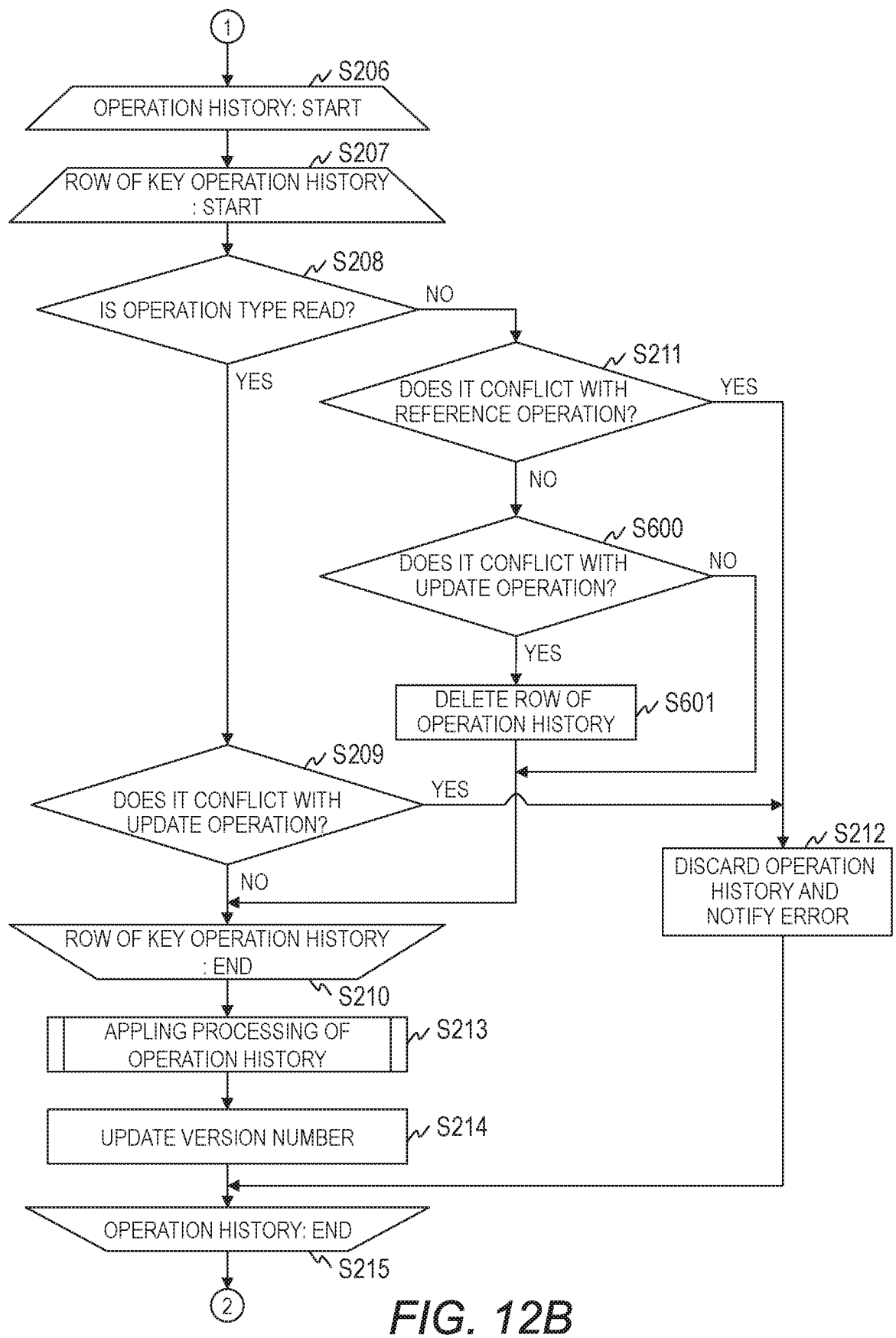

FIGS. 12A and 12B are flowcharts for explaining processing executed by the server 100 according to Embodiment 3. FIGS. 12A and 12B illustrate the processing from receiving the plurality of operation histories 500 until applying the plurality of operation histories 500.

Embodiment 3 is partially different in the processing after Step S211. In Step S211, in a case where it is determined that the updating operation corresponding to the selected row does not conflict with any referencing operations included in the other transaction processing, the conflict judgment module 142 of the replication parallelism control module 114 determines whether the updating operation corresponding to the selected row conflicts with any updating operations included in the other transaction processing (Step S600). Specifically, the following processing is executed.

The conflict judgment module 142 instructs the data management module 116 to read the value of the update number 404 of the key-value data corresponding to the key 521 of the selected row. The conflict judgment module 142 determines whether the commit number 510 of the selected operation history 500 is larger than the read value of the update number 404.

In a case where the value of the commit number 510 is larger than the value of the update number 404, the conflict judgment module 142 determines that the updating operation corresponding to the selected row does not conflict with any updating operations included in the other transaction processing. On the other hand, in a case where the value of the commit number 510 is equal to or smaller than the value of the reference number 403, the conflict judgment module 142 determines that the updating operation corresponding to the selected row conflicts with updating operation(s) included in the other transaction processing. The foregoing is the explanation of the processing at Step S600.

In a case where it is determined that the updating operation corresponding to the selected row does not conflict with any updating operations included in the other transaction processing, the conflict judgment module 142 of the replication parallelism control module 114 proceeds to Step S210.

In a case where it is determined that the updating operation corresponding to the selected row conflicts with updating operation(s) included in the other transaction processing, the conflict judgment module 142 of the replication parallelism control module 114 deletes the selected row from the key operation history 520 (Step S601) and then proceeds to Step S210.

That is to say, even if the updating operation corresponding to the selected row conflicts with updating operation(s) included in the other transaction processing, the conflict judgment module 142 deletes the selected row from the selected operation history 500 and then determines the transaction processing corresponding to the operation history 500 does not conflict with any other transaction processing.

The remaining processing is the same as the processing in Embodiment 1.

In the case where updating operations onto the same key are included in a plurality of pieces of transaction processing, the value of the data is overwritten by each of the plurality of pieces of transaction processing. Embodiment 3 coordinates the operations included in the plurality of pieces of transaction processing to execute the necessary updating operation if updating operations are conflicting.

Accordingly, in Embodiment 3, the conflict judgment module 142 deletes unnecessary updating operations but does not abort the transaction processing itself in a case where a plurality of pieces of transaction processing each which include conflicting updating operations. As a result, Embodiment 3 increases the availability of the distributed KVS while guaranteeing the consistency in the distributed KVS.

Embodiment 4

In Embodiment 4, the server 100 provides information including the total number of pieces of accepted transaction processing and the total number of pieces of aborted transaction processing to the client apparatus 200 for display. Hereinafter, Embodiment 4 is described, focusing the differences from Embodiment 1.

The configuration of the computer system in Embodiment 4 is the same as the configuration of the computer system in Embodiment 1; accordingly, the explanation thereof is omitted. The operation history information 121 and the data store 122 in Embodiment 4 are the same as those in Embodiment 1; accordingly, the explanation thereof is omitted. Further, the processing from receiving the execution request of transaction processing until transmitting the operation history 500 is the same as the processing in Embodiment 1; accordingly, the explanation there of is omitted.

In Embodiment 4, the processing executed by the conflict judgment module 142 is partially different. The conflict judgment module 142 in Embodiment 4 temporarily holds the number of pieces of accepted transaction processing and the number of pieces of aborted transaction processing. The initial values for the number of pieces of accepted transaction processing and the number of pieces of aborted transaction processing are both set to 0. In the following description, the number of pieces of accepted transaction processing is also referred to as acceptance number, the number of pieces of aborted transaction processing as abortion number.

In Step S202, the conflict judgment module 142 increases the acceptance number by "1". In Step S205, the conflict judgment module 142 outputs the acceptance number to the statistical information management module 117. Thereafter, the conflict judgment module 142 resets the acceptance number and the abortion number.

In Step S206, the conflict judgment module 142 increases the acceptance number by "1". In Step S212, the conflict judgment module 142 increases the abortion number by "1". In Step S215, the conflict judgment module 142 outputs the acceptance number and the abortion number to the statistical information management module 117. Thereafter, the conflict judgment module 142 resets the acceptance number and the abortion number.

The statistical information management module 117 in this embodiment manages the total number of pieces of accepted transaction processing and the total number of pieces of aborted transaction processing. The initial values of the total number of pieces of accepted transaction processing and the total number pieces of aborted transaction processing are both 0.

In a case of receiving the acceptance number and the abortion number from the conflict judgment module 142, the statistical information management module 117 adds the acceptance number to the total acceptance number and adds the abortion number to the total abortion number.

The statistical information management module 117 stores the total acceptance number and the total abortion number in a predetermined period to the statistical information 124 as statistical data. Thereafter, the statistical information management module 117 resets the total acceptance number and the total abortion number.

In the statistical information 124 in this embodiment, a plurality of pieces of statistical data in each of which daily total acceptance number, daily total abortion number, and a date are associated.

Figure 13:
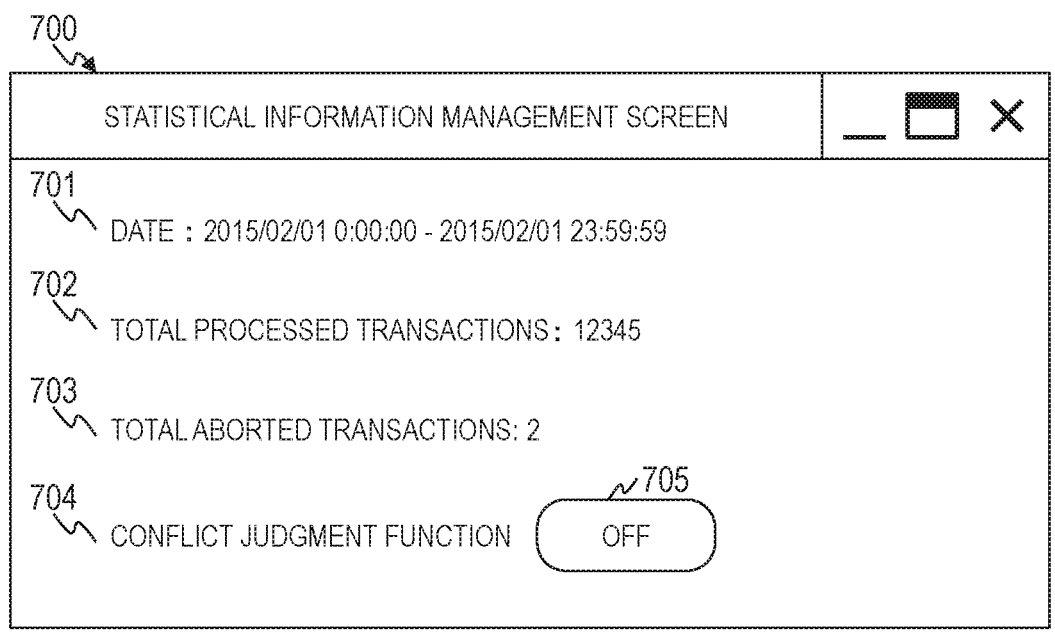
FIG. 13 is an explanatory diagram for illustrating a statistical information management screen displayed by display module according to Embodiment 4.

FIG. 13 is an explanatory diagram for illustrating a statistical information management screen displayed by the display module 213 according to Embodiment 4.

To display the screen shown in FIG. 13, the client UAP 211 in the client apparatus 200 transmits an obtaining request for statistical information including date to the server 100. The server UAP 112 of the server 100 outputs the obtaining request to the statistical information management module 117. The statistical information management module 117 reads the statistical information matching the date included in the obtaining request, and generates display information to display the screen shown in FIG. 13. The statistical information management module 117 further transmits the display information to the client apparatus 200 through the server UAP 112.

In a case of receiving the display information, the client UAP 211 of the client apparatus 200 outputs the display information to the display module 213. The display module 213 displays the statistical information management screen 700 shown in FIG. 13 based on the display information.

The statistical information screen 700 includes a date view area 701, a total processed transactions view area 702, a total aborted transactions view area 703, and a conflict judgment function on/off area 704.

The date view area 701 is an area for displaying the date included in the statistical data. The total processed transactions view area 702 is an area for displaying the total acceptance number included in the statistical data. The total aborted transactions view area 703 is an area for displaying the total abortion number included in the statistical data. The conflict judgment function on/off area 704 is an area for displaying an operation button 705 to disable the conflict judgment module 142 of the replication parallelism control module 114.

In a case where the proportion of the total abortion number to the total acceptance number is high, it indicates that a large number of pieces of transaction processing are aborted. In such a case, aborting all transaction processing like in the prior art results in efficient operation. For this reason, the user disables the conflict judgment module 142 as necessary with reference to the statistical information screen 700.

In a case where the user operates the operation button 705, the client UAP 211 of the client apparatus 200 transmits a request to disable the conflict judgment function to a server 100. In a case of receiving the request to disable the conflict judgment function, the server UAP 112 outputs the request to the replication parallelism control module 114. In a case of receiving the request to disable the conflict judgment function, the replication parallelism control module 114 disables the conflict judgment module 142.

As a result, in Step S201, in a case where it is determined that there exists a combination of operation histories 500 including operations onto the same key, the conflict judgment module 142 aborts all the transaction processing (the operation histories 500) without executing the processing subsequent to Step S206.

According to Embodiment 4, it can be visually recognize for the user to display information showing the effects of the conflict judgment function. Further, the conflict judgment function can be disabled as appropriate in accordance with the judgment of the user.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, and Java (registered trademark).

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer system comprising a plurality of computers coupled to one another via a network,
the computer system having a database constructed from storage areas included in each of the plurality of computers,
the database being configured to store a plurality of pieces of data, each of the plurality of pieces of data includes a first operation number for managing an operation status by transaction processing, a piece of transaction processing including a plurality of operations onto the database,
the plurality of pieces of data being allocated to the plurality of computers in accordance with predetermined management ranges,
the plurality of computers being configured to:
operate as a master configured to control the plurality of operations onto data included in a management range; and
hold a plurality of pieces of replicated data included in a different management range in order to operate as a master of the different management range in place of another computer operating as a master of the different management range, and
the plurality of computers including:
a control module configured to generate an operation history indicating specifics of each of the plurality of operations included in the piece of transaction processing in a case of receiving an execution request of transaction processing;
a distribution module configured to determine a sequence number of applying a plurality of operation histories to the database and transmit the plurality of operation histories with the sequence number to the other computers;
a conflict judgment module configured to, in a case of receiving from the distribution module a plurality of operation histories generated by a plurality of computers each operating as a master controlling a same management range, determine whether each of a plurality of pieces of transaction processing each corresponding to the plurality of operation histories conflicts based on the first operation number; and
an applying module configured to apply an operation history corresponding to a piece of transaction processing to the database: the piece of transaction processing is determined by the conflict judgment module not to conflict with any other transaction processing,
wherein the operation history includes a commit number indicating an update status of the database as a time of receiving a commit request for the transaction processing,
wherein the conflict judgment module is configured to:
manage a version number to manage an update status of the data included in the database managed by the plurality of servers as a master; and
output the version number as a time of receiving an execution request of new transaction processing to the control module in a case of receiving the execution request of the new transaction processing,
wherein the control module is configured to set the outputted version number to the operation history corresponding to the new transaction processing as the commit number,
wherein the conflict judgment module is further configured to:
select a first operation history from the plurality of operation histories in the case of receiving the plurality of operation histories;
select a first operation from a plurality of operations included in the first operation history;
compare the first operation number of first data to be operated in the first operation with the commit number included in the first operation history to determine whether the first operation conflicts with any of the operations each included in the plurality of operation histories other than the first operation history;
determine that a piece of transaction processing corresponding to the first operation history does not conflict with any of the other transaction processing in a case of determining that all operations included in the first operation history do not conflict with any operations each included in the plurality of operation histories other than the first operation history; and
notify an error in a case of determining that at least one operation included in the first operation history conflicts with operations included in the plurality of operation histories other than the first operation history,
wherein the plurality of computers hold: a group operation history including a plurality of entries each including identification information on a group being a set of the plurality of pieces of data, identification information on the plurality of pieces of data included in the group, and a second operation number managing an operating status by transaction processing including a plurality of group unit operations, and
wherein the conflict judgment module is configured to:
obtain the second operation number of a first group to be operated by the first operation from the group operation history in a case where the first operation is a group unit operation; and
compare the second operation number with the commit number of the first operation history to determine whether the first operation conflicts with one or more operations included in the plurality of operation histories other than the first operation history.

2. The computer system according to claim 1,
wherein the plurality of operations include a referencing operation to read a value of data and an updating operation to write a value of the data,
wherein the first operation number includes a reference number managing an operation status of data operated by the referencing operation and an update number managing an operation status of data operated by the updating operation, wherein the conflict judgment module is configured to:
determine whether the first operation is the referencing operation;
obtain the update number of the first data in a case where it is determined that the first operation is the referencing operation;
determine that the referencing operation does not conflict with any updating operations each included in the plurality of operation histories other than the first operation history in a case where the commit number of the first operation history is larger than the update number of the first data;
obtain the reference number of the first data in a case where it is determined that the first operation is the updating operation; and
determine that the updating operation does not conflict with any referencing operations each included in the plurality of operation histories other than the first operation history in a case where the commit number of the first operation history is larger than the reference number of the first data, and
wherein the applying module is configured to:
select a second operation from a plurality of operations included in a second operation history in a case of receiving the second operation history as the operation history corresponding to a piece of transaction processing determined by the conflict judgment module not to conflict with any of the other transaction processing;
determine whether the second operation is the referencing operation;
set the commit number included in the second operation history to the reference number of second data to be operated by the second operation in a case where it is determined that the second operation is the referencing operation; and
execute the updating operation onto the database based on the second operation in a case where it is determined that the second operation is the updating operation, and set the commit number included in the second operation history to the update number of the second data.

3. The computer system according to claim 2, wherein the conflict judgment module is configured to update the version number by adding one to the version number after the applying module has executed the second operation history.

4. The computer system according to claim 2, wherein the conflict judgment module is configured to:
further obtain the update number of the first data in a case where it is determined that the updating operation does not conflict with any referencing operations each included in the plurality of operation histories other than the first operation history;
determine whether the commit number of the first operation history is larger than the update number of the first data;
delete the first operation from the first operation history in a case where the commit number of the first operation history is equal to or smaller than the update number of the first data; and
determine that a piece of transaction processing corresponding to the first operation history after the first operation is deleted does not conflict with any of the other transaction processing.

5. The computer system according to claim 1, wherein the conflict judgment module is configured to:
analyze specifics of the plurality of operations included in each of the plurality of pieces of transaction processing based on the plurality of operation histories in a case of receiving the plurality of operation histories;
determine whether two or more operation histories including an operation onto the same data exist based on the result of the analysis; and
determine that the plurality of pieces of transaction processing each corresponding to the plurality of operation histories does not conflict with any of the other transaction processing in a case where two or more operation histories including an operation onto the same data do not exist.

6. The computer system according to claim 1,
wherein the plurality of computers include a statistical information management module configured to manage a total acceptance number indicating a total number of pieces of accepted transaction processing and a total abortion number indicating a total number of pieces of aborted transactions,
wherein the conflict judgment module is configured to:
discard the first operation history in a case of determining that at least one operation included in the first operation history conflicts with an operation included in the operation histories other than the first operation history; and
output a number of received operation histories and a number of discarded operation histories to the statistical information management module, and
wherein the statistical information management module is configured to:
add the number of received operation histories to the total acceptance number;
add the number of discarded operation histories to the total abortion number; and
generate display information to display the total acceptance number and the total abortion number.

7. A transaction processing management method performed in a computer system,
the computer system including a plurality of computers coupled to one another via a network and having a database constructed from storage areas included in each of the plurality of computers,
the database storing a plurality of pieces of data, each of the plurality of pieces of data includes a first operation number for managing an operation status by transaction processing, a piece of transaction processing including a plurality of operations onto the database,
the plurality of pieces of data being allocated to the plurality of computers in accordance with predetermined management ranges,
the plurality of computers being configured to:
operate as a master configured to control the plurality of operations onto data included in a management range; and
hold a plurality of pieces of replicated data included in a different management range in order to operate as a master of the different management range in place of another computer operating as a master of the different management range,
the plurality of computers including a control module, a distribution module, a conflict judgment module, and an applying module,
the transaction processing management method including:
a first step of generating, by the control module, an operation history indicating specifics of each of the plurality of operations included in the piece of transaction processing in case of receiving an execution request of transaction processing;

a second step of determining, by the distribution module, a sequence number of applying the plurality of operation histories to the database and transmitting, by the distribution module, the plurality of operation histories with the sequence number to the other computers;

a third step of determining, by the conflict judgment module, in a case of receiving from the distribution module a plurality of operation histories generated by a plurality of computers each operating as a master configured to control a same management range, whether each of a plurality of pieces of transaction processing each corresponding to the plurality of operation histories conflicts based on the first operation number; and a fourth step of applying, by the applying module, an operation history corresponding to a piece of transaction processing to the database: the piece of transaction processing is determined by the conflict judgment module not to conflict with any other transaction processing, wherein the operation history includes a commit number indicating an update status of the database as a time of receiving a commit request for the transaction processing, wherein the conflict judgment module is configured to manage a version number to manage an update status of the data included in the database managed by the plurality of servers as a master, wherein the transaction processing management method further includes:

a step of outputting, by the conflict judgment module, the version number as a time of receiving an execution request of new transaction processing to the control module in a case of receiving the execution request of the new transaction processing; and a step of setting, by the control module, the outputted version number to the operation history corresponding to the new transaction processing as the commit number, and wherein the third step includes:

a fifth step of selecting a first operation history from the plurality of operation histories in a case of receiving the plurality of operation histories;

a sixth step of selecting a first operation from a plurality of operations included in the first operation history;

a seventh step of comparing the first operation number of first data to be operated in the first operation with the commit number included in the first operation history to determine whether the first operation conflicts with any of the operations each included in the plurality of operation histories other than the first operation history;

an eighth step of determining that a piece of transaction processing corresponding to the first operation history does not conflict with any of the other transaction processing in a case of determining that all operations included in the first operation history do not conflict with any operations each included in the plurality of operation histories other than the first operation history; and a ninth step of notifying an error in a case of determining that at least one operation included in the first operation history conflicts with operations included in the plurality of operation histories other than the first operation history, wherein the plurality of computers hold: a group operation history including a plurality of entries each including identification information on a group being a set of the plurality of pieces of data, identification information on the plurality of pieces of data included in the group, and a second operation number managing an operating status by transaction processing including a plurality of group unit operations, and wherein the seventh step includes:

a step of obtaining the second operation number of a first group to be operated by the first operation from the group operation history in a case where the first operation is a group unit operation; and a step of comparing the second operation number with the commit number of the first operation history to determine whether the first operation conflicts with one or more operations included in the plurality of operation histories other than the first operation history.

8. The transaction processing management method according to claim 7, wherein the plurality of operations include a referencing operation to read a value of data and an updating operation to write a value of the of data, wherein the first operation number includes a reference number managing an operation status of data operated by the referencing operation and an update number managing an operation status of data operated by the updating operation, wherein the seventh step includes:

a tenth step of determining whether the first operation is the referencing operation;

an eleventh step of obtaining the update number of the first data in a case where it is determined that the first operation is the referencing operation;

a twelfth step of determining that the referencing operation does not conflict with any updating operations each included in the plurality of operation histories other than the first operation history in a case where the commit number of the first operation history is larger than the update number of the first data;

a thirteenth step of obtaining the reference number of the first data in the case where it is determined that the first operation is the updating operation; and a fourteenth step of determining that the updating operation does not conflict with any referencing operations each included in the plurality of operation histories other than the first operation history in the case where the commit number of the first operation history is larger than the reference number of the first data, and wherein the fourth step includes:

a step of selecting a second operation from a plurality of operations included in a second operation history in a case of receiving the second operation history as the operation history corresponding to a piece of transaction processing determined by the conflict judgment module not to conflict with any of the other transaction processing;

a step of determining whether the second operation is the referencing operation;

a step of setting the commit number included in the second operation history to the reference number of second data to be operated by the second operation in a case where it is determined that the second operation is the referencing operation; and a step of executing the updating operation onto the database based on the second operation in a case where it is determined that the second operation is the updating operation, and setting the commit number included in the second operation history to the update number of the second data.

9. The transaction processing management method according to claim 8, further including a step of updating, by the conflict judgment module, the version number by adding one to the version number after the applying module has executed the second operation history.

10. The transaction processing management method according to claim 8, wherein the fourteenth step includes:
   a step of further obtaining the update number of the first data in a case where it is determined that the updating operation does not conflict with any referencing operations each included in the plurality of operation histories other than the first operation history;
   a step of determining whether the commit number of the first operation history is larger than the update number of the first data;
   a step of deleting the first operation from the first operation history in a case where the commit number of the first operation history is equal to or smaller than the update number of the first data; and
   a step of determining that a piece of transaction processing corresponding to the first operation history after the first operation is deleted does not conflict with any of the other transaction processing.

11. The transaction processing management method according to claim 7, wherein the third step includes:
   a step of analyzing specifics of the plurality of operations included in each of the plurality of pieces of transaction processing based on the plurality of operation histories in a case of receiving the plurality of operation histories;
   a step of determining whether two or more operation histories including an operation onto the same data exist based on the result of the analysis; and
   a step of determining that the plurality of pieces of transaction processing each corresponding the plurality of operation histories does not conflict with any of the other transaction processing in a case where two or more operation histories including an operation onto the same data do not exist.

* * * * *